United States Patent
Mages et al.

(10) Patent No.: US 12,443,552 B2
(45) Date of Patent: Oct. 14, 2025

(54) TRANSMISSION MODULE FOR A TRANSMITTING/RECEIVING DEVICE OF A SUBSCRIBER STATION OF A SERIAL BUS SYSTEM, AND METHOD FOR TRANSMITTING A MESSAGE WITH DIFFERENTIAL SIGNALS IN A SERIAL BUS SYSTEM

(71) Applicant: Robert Bosch GmbH, Stuttgart (DE)

(72) Inventors: Christian Mages, Stuttgart (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/670,968

(22) Filed: May 22, 2024

(65) Prior Publication Data

US 2024/0411713 A1 Dec. 12, 2024

(30) Foreign Application Priority Data

Jun. 6, 2023 (DE) ...................... 10 2023 205 267.9

(51) Int. Cl.
*G06F 13/374* (2006.01)
*G06F 13/42* (2006.01)

(52) U.S. Cl.
CPC ........ *G06F 13/374* (2013.01); *G06F 13/4282* (2013.01)

(58) Field of Classification Search
CPC ............... G06F 13/374; G06F 13/4282; H04L 12/40013; H04L 12/413; H04L 12/407; H04L 2012/40215
See application file for complete search history.

(56) References Cited

U.S. PATENT DOCUMENTS

2014/0091833 A1* 4/2014 Astrom ............... H04L 25/0272
326/31
2019/0288870 A1* 9/2019 de Haas ............ H04L 12/40032
(Continued)

FOREIGN PATENT DOCUMENTS

| WO | 9946888 A1 | 9/1999 |
| WO | 2023280473 A1 | 1/2023 |

OTHER PUBLICATIONS

ISO 11898-1:2015 Standard, "Road Vehicles—Controller Area Network (CAN)—Part 1: Data Link Layer and Physical Signalling," 2015, pp. 1-74.

*Primary Examiner* — Phong H Dang
(74) *Attorney, Agent, or Firm* — NORTON ROSE FULBRIGHT US LLP

(57) ABSTRACT

A transmission module of a transmitting/receiving device for a subscriber station of a serial bus system and a method. The transmission module transmits a digital transmit signal as an analog differential signal on a bus of the bus system to transmit a message to another subscriber station. The transmission module generates the states, specified by the digital transmit signal over the time, on the bus by changing bus voltage and/or bus impedance. The transmission module changes the specified states on the bus via a predetermined sequence of intermediate states for the bus voltage and/or the bus impedance toward the desired state on the bus. The transmission module, when signaling changes during a transition between two specified states on the bus, changes the transition back again continuously with the opposite sequence of intermediate states from the intermediate state reached by then.

17 Claims, 9 Drawing Sheets

(56) References Cited

U.S. PATENT DOCUMENTS

2021/0083898 A1\* 3/2021 Mutter ................ H04L 12/4015
2021/0336817 A1\* 10/2021 Mutter .............. H04L 12/40013
2021/0374083 A1\* 12/2021 de Haas .................. G06F 13/20
2022/0029850 A1   1/2022 Mutter et al.

\* cited by examiner

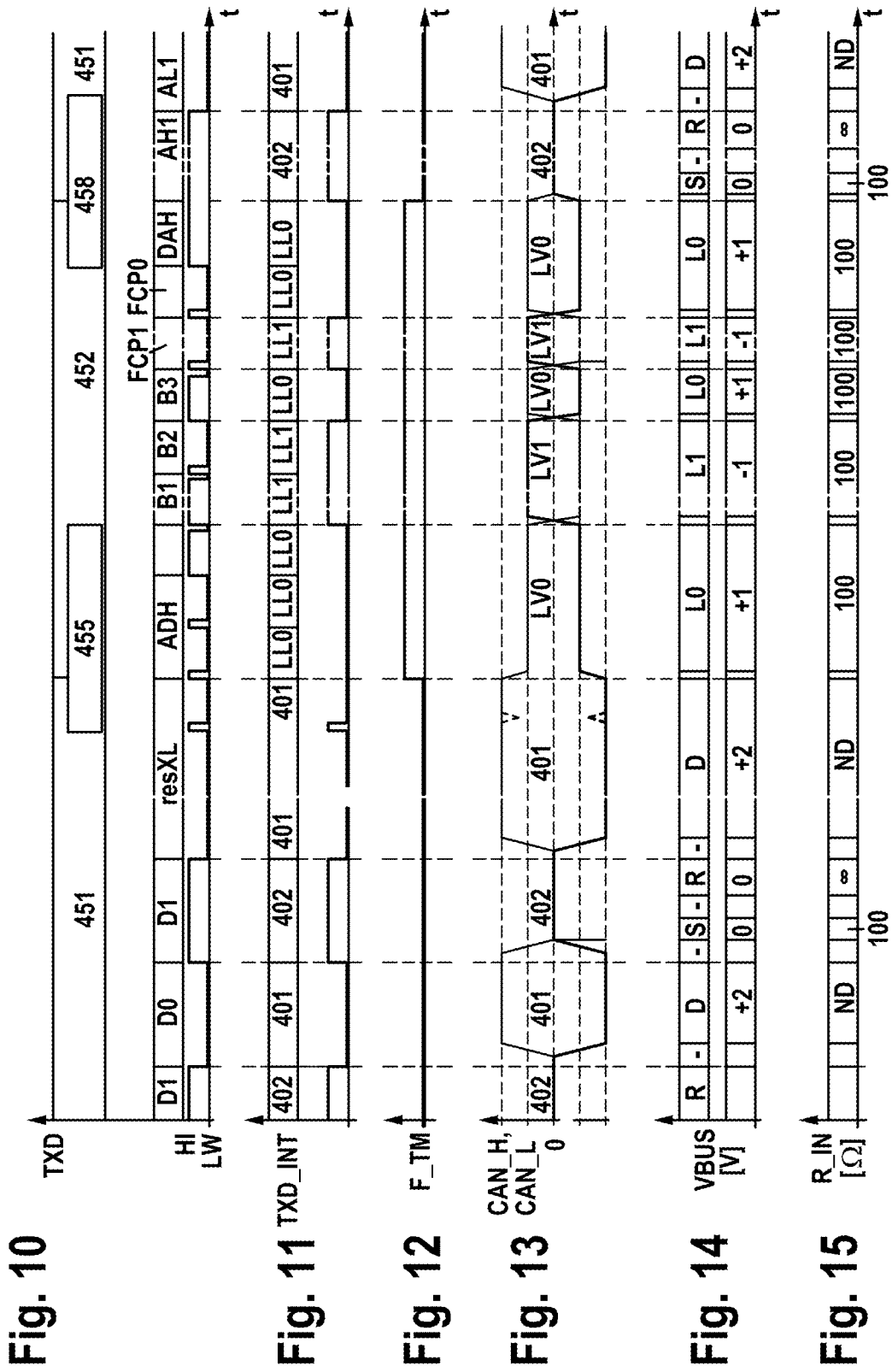

TRANSMISSION MODULE FOR A TRANSMITTING/RECEIVING DEVICE OF A SUBSCRIBER STATION OF A SERIAL BUS SYSTEM, AND METHOD FOR TRANSMITTING A MESSAGE WITH DIFFERENTIAL SIGNALS IN A SERIAL BUS SYSTEM

CROSS REFERENCE

The present application claims the benefit under 35 U.S.C. § 119 of German Patent Application No. DE 10 2023 205 267.9 filed on Jun. 6, 2023, which is expressly incorporated herein by reference in its entirety.

FIELD

The present invention relates to a transmission module for a transmitting/receiving device of a subscriber station of a serial bus system and to a method for transmitting a message with differential signals in a serial bus system, which is in particular a CAN XL bus system.

BACKGROUND INFORMATION

In technical systems, such as production systems, vehicles, etc., serial bus systems are often used for message transfer or data transfer between, for example, sensors, actuators, control devices as subscriber stations. At a subscriber station, a transmitting/receiving device, also called a transceiver, is connected to the bus of the bus system and transmits messages to the bus and/or receives messages from the bus.

For a CAN bus system, CAN SIC or CAN XL is by now used in addition or as an alternative to transferring messages by means of the CAN and/or CAN FD protocol, as described in the ISO-11898-1:2015 standard as CAN protocol specification with CAN FD.

In the case of CAN FD and its successor bus systems, such as CAN SIC and CAN XL, when transferring on the bus, switching takes place between a slow operating mode in a first communication phase (arbitration phase) and a fast operating mode in a second communication phase (data phase). For example, CAN FD is used by most manufacturers with a 500 kbit/s arbitration bit rate and a 2 Mbit/s data bit rate in the vehicle.

The successor bus systems for CAN FD are compatible with CAN FD and designed for even greater data rates in the second communication phase. In the case of CAN SIC according to the CiA601-4 standard of the CAN in Automation (CiA) organization, a data rate of about 5 to 8 Mbit/s is achieved in the second communication phase. In the case of CAN XL according to the CiA601-3 standard, a data rate in the second communication phase of >10 Mbit/s is required.

In the CAN XL, CAN FD and CAN SIC bus systems, the data are thus transmitted to the bus at a higher data rate in the second communication phase than in the first communication phase. For this purpose, in CAN XL, a bit of a transmit signal in the second communication phase not only has a shorter bit duration or bit time or time length than in the first communication phase but is usually also to be transmitted to the bus with a different physical layer and received with a different reception threshold than in the first communication phase. Accordingly, in CAN XL, the bus levels of the CAN_H, CAN_L bus signals for the first communication phase may be different from the bus levels of the second communication phase. As a result, there are at least four different bus levels on the bus. In CAN XL, the type of communication in the second communication phase is also called FAST MODE. The physical layer corresponds to the bit transfer layer or layer 1 of the conventional OSI (open systems interconnection) model.

A CAN XL communication therefore distinguishes at least 4 different voltages VCAN on the bus, which are given by the voltage difference between the two CAN outputs (VCANH and VCANL) of a transmitting/receiving device. VCAN: =VCANH-VCANL applies here. In addition, 3 to 4 different bus impedances R_IN are possible. R_IN is given by the impedance or Z parameter between the two CAN outputs. In total, 5 different output states result on the bus, characterized by VCAN and R_IN. These output states on the bus 40 are called dom, rec for the arbitration phase, Level1 and Level0 or LV1 and LV0 for the data phase 452, and sic. The sic state is an impedance-adjusted recessive state that corresponds to the rec state with respect to the bus voltage but is generated with an output impedance of 100Ω and transmitted at the beginning of each rec state. The sic state is intended to mitigate the production and propagation of reflections in the bus network (waveguide), which are produced in the case of high data rates in a traditional CAN system. The switching between the states is specified by a transmit signal of a communication control device of the subscriber station connected to the transmitting/receiving device.

However, for the transmitting/receiving device, there is the problem that the signaling of the state change with the transmit signal is not predictable. The external signaling may therefore change at any time, i.e., even during a just occurring transition between two different bus states, and a different end state may therefore be desired.

In addition, it is problematic that not all transitions between the mentioned states are allowed according to the CAN XL standard. As a result, the transmitting/receiving device must, if necessary, run through so-called loops in order to switch from a first predetermined state into a second predetermined state if the direct transition between these first and second predetermined states is not allowed.

Moreover, the respective (allowed) transitions are precisely defined in terms of time. No abrupt state changes on the bus that have a jump in the differential voltage or in the output impedance should be visible. This is because abrupt state changes on the bus result in strong emissions and additional reflections that violate the emission and bus integrity requirements.

CAN XL therefore requires a transmitting/receiving device (transceiver) that avoids abrupt transitions on the bus for all operating phases of the communication on the bus in order to minimize emissions and reflections and ensure the most error-free communication possible.

SUMMARY

It is an object of the present invention to provide a transmission module for a transmitting/receiving device of a subscriber station of a serial bus system and a method for transmitting a message with differential signals in a serial bus system that solve the aforementioned problems. To be provided in particular are a transmission module for a transmitting/receiving device of a subscriber station of a serial bus system and a method for transmitting a message with differential signals in a serial bus system that make it possible as inexpensively as possible to create/generate bus signals reliably and, if possible, without errors and with low emissions, even if the external signaling changes during a just occurring transition between two different bus states and a different end state is therefore desired than before the beginning of the just occurring transition.

The object may be achieved by a transmission module for a transmitting/receiving device of a subscriber station of a serial bus system with features of the present invention. According to an example embodiment of the present invention, in the bus system, the transmission module is designed to transmit a digital transmit signal as an analog differential signal to a bus of the bus system in order to transmit a message to at least one other subscriber station of the bus system, wherein bits of the digital transmit signal have a greater bit duration in a first communication phase than in a second communication phase of the transmit signal. The transmission module is designed to generate the states, specified by the digital transmit signal over the time, on the bus by changing bus voltage and/or bus impedance, wherein the transmission module is designed to change the specified states on the bus via a predetermined sequence of intermediate states for the bus voltage and/or the bus impedance toward the desired state on the bus, and wherein the transmission module is designed, when signaling changes during a transition between two specified states on the bus, to change the transition back again continuously with the opposite sequence of intermediate states from the intermediate state reached by then.

With the described transmission module of the present invention, data rates significantly above 40 MBps can be achieved easily.

The described transmission module of the present invention is designed such that the topology of the possible states on the bus is simplified. This is realized by eliminating the need to run through loops and being able to invert any transition. All transitions that can be represented by the TXD_INT, FAST transmit signals can be carried out with continuous differential voltage and output impedance.

Moreover, the described transmission module of the present invention can ensure that the end state is reached in a time-correct manner on the bus. For this purpose, each trigger, such as the TXD_INT, F_TM signals or the expiry of the time t_sic, individually starts a fixed time sequence between start time and end time for the rising and for the falling edge of a bus state. This sequence may also be called a delay chain. The sequence changes the state on the bus in a continuous and time-correct manner toward the desired state via defined intermediate states defined by the differential voltage and the bus impedance. When signaling changes during a transition between two bus states, the currently reached intermediate state stays the same, i.e., the current sequence is stopped, and is reversed again in a continuous and time-correct manner by means of the opposite sequence.

In this way, the described transmission module ensures that the bus has no abrupt transitions in differential voltage VBUS, or the voltage VCAN, and/or impedance. As a result, the transmitting/receiving device generates little to no emissions or reflections in the bus system.

Another advantage is that control between the states can take place very inexpensively with the described transmission module of the present invention. As a result, the transmitting/receiving device can cover a great many possibilities in a time-correct and continuous manner in order to ensure time-correct switching into the end state without abrupt transitions.

The described transmission module of the present invention can thus very advantageously ensure that the time window of the last valid transition is complied with. As a result, the specification for CAN XL is in particular not violated.

Overall, as a result, the described transmitting/receiving device not only can realize the communication in the bus system between other subscriber stations with the high bit rates required for CAN XL but is also designed such that the transferable bit rate is not reduced by errors in the communication.

Advantageous further configurations of the transmission module of the present invention are disclosed herein.

In an embodiment example of the present invention, the transmission module has a synchronous logic for generating the predetermined sequence of intermediate states for the bus voltage and/or the bus impedance toward the desired state on the bus.

In another embodiment example of the present invention, the transmission module is designed to generate the various states of the digital transmit signal on the bus as dominant states and recessive states, wherein the transmission module is designed to generate a transition from a dominant state into a recessive state via an impedance-adjusted recessive state that corresponds to the recessive state with respect to the bus voltage but is generated with a different bus impedance than the recessive state and transmitted at the beginning of each recessive state.

In the aforementioned other embodiment example, the transmission module comprises, for example, a first switching chain for changing the amplitude of the bus voltage and/or the value of the bus impedance in steps, depending on at least one edge of a transmit signal; a second switching chain for changing the amplitude of the bus voltage and/or the value of the bus impedance in steps, depending on at least one edge of the inverted transmit signal; and a logic circuit, which is connected to the first switching chain and the second switching chain.

In one configuration of the present invention, each of the delay elements of the first switching chain delays the edge of the inverted transmit signal by a predetermined time, wherein each of the delay elements of the second switching chain delays the edge of the transmit signal by the predetermined time.

The first switching chain can alternately comprise a delay element, which in particular has a switchable capacitance, and an AND gate, which are connected in series, wherein the second switching chain alternately comprises a delay element, which in particular has a switchable capacitance, and an AND gate, which are connected in series, and wherein both the first switching chain and the second switching chain comprise a delay element at their beginning and at their end.

At least two of the delay elements of a switching chain may have differently sized switchable capacitances.

In the first and second switching chains, the output of each AND gate can be connected to the input of one of the delay elements.

In one configuration of the present invention, the logic circuit comprises a predetermined number of logic elements.

One of the logic elements can be connected at its one input to the output of the delay element arranged at the beginning of the first delay chain, wherein one of the logic elements is connected at its one input to the output of the delay element arranged at the beginning of the second delay chain. Here, the logic elements can be flip-flops whose first input is connected to a first input of an AND gate of the first switching chain and whose second input is connected to a first input of an AND gate of the second switching chain.

A second input of the AND gate of the second switching chain can be connected to a port for inputting the digital transmit signal, wherein a second input of the AND gate of the first switching chain is connected to a port for inputting the inverted digital transmit signal.

Optionally, according to an example embodiment of the present invention, the transmission module also comprises an edge detector for detecting falling edges of the transmit signal; an edge detector for detecting falling edges of an operating mode switching signal, which signals to the transmission module the operating mode into which the transmission module is to be switched for the current communication phase; an edge detector for detecting rising edges of the transmit signal; an edge detector for detecting rising edges of the operating mode switching signal, wherein the logic circuit is designed to generate the predetermined sequence of intermediate states for the bus voltage and/or the bus impedance toward the desired state on the bus on the basis of the detection result of at least one of the edge detectors.

The above-described transmission module of the present invention can be part of a transmitting/receiving device, which also includes a reception module for receiving signals from the bus and for generating a digital receive signal from the analog differential signal.

The transmission module of the present invention may be designed to generate the analog differential signals with a different physical layer in the first communication phase of the message than in the second communication phase.

According to an example embodiment of the present invention, the above-described transmitting/receiving device can be part of a subscriber station for a serial bus system. The subscriber station can also be a communication control device for controlling the communication in the bus system and for generating the first transmit signal. The subscriber station can be designed for the communication in the bus system in which exclusive, collision-free access of a subscriber station to the bus of the bus system is ensured at least temporarily.

The aforementioned object may also be achieved by a method for transmitting a message with differential signals in a serial bus system with features of the present invention. According to an example embodiment of the present invention, the method is performed with a transmission module of a transmitting/receiving device, which transmission module is designed to transmit a digital transmit signal as an analog differential signal to a bus of the bus system in order to transmit a message to at least one other subscriber station of the bus system, wherein bits of the digital transmit signal have a greater bit duration in a first communication phase than in a second communication phase of the transmit signal, and wherein the method comprises the steps of generating the states, specified by the digital transmit signal over the time, on the bus by changing bus voltage and/or bus impedance, wherein the transmission module is designed to change the specified states on the bus via a predetermined sequence of intermediate states for the bus voltage and/or the bus impedance toward the desired state on the bus, and wherein the transmission module is designed, when signaling changes during a transition between two specified states on the bus, to change the transition back again continuously with the opposite sequence of intermediate states from the intermediate state reached by then.

The method of the present invention offers the same advantages as those mentioned above with reference to the transmission module of the present invention.

Further possible implementations of the present invention also include not explicitly mentioned combinations of features or embodiments that are described above or below with respect to the embodiment examples. The person skilled in the art will also add individual aspects as improvements or supplements to the respective basic form of the present invention.

BRIEF DESCRIPTION OF THE DRAWINGS

The present invention is described below in further detail with reference to the figures and on the basis of embodiment examples.

FIG. 10 to FIG. 12 show signal curves over the time in the transmitting/receiving device of FIG. 9.

FIG. 13 shows the time curve of the CAN_H, CAN_L bus signals, which are transmitted from the transmitting/receiving device of FIG. 9 to the bus of the bus system as a consequence of the signals of FIG. 10 to FIG. 12.

FIG. 14 shows the respectively required bus states of the CAN_H, CAN_L bus signals of FIG. 13 and the associated values of the bus voltage VBUS, which are to be approached or generated over the time t by the transmitting/receiving device of FIG. 9.

FIG. 15 shows the time curve of an impedance R_IN set by the transmitting/receiving device of FIG. 9 for generating the CAN_H, CAN_L bus signals of FIG. 13 or the states of FIG. 14.

In the figures, identical or functionally identical elements are provided with the same reference signs, unless otherwise specified.

DETAILED DESCRIPTION OF EXAMPLE EMBODIMENTS

Figures 1, 2:
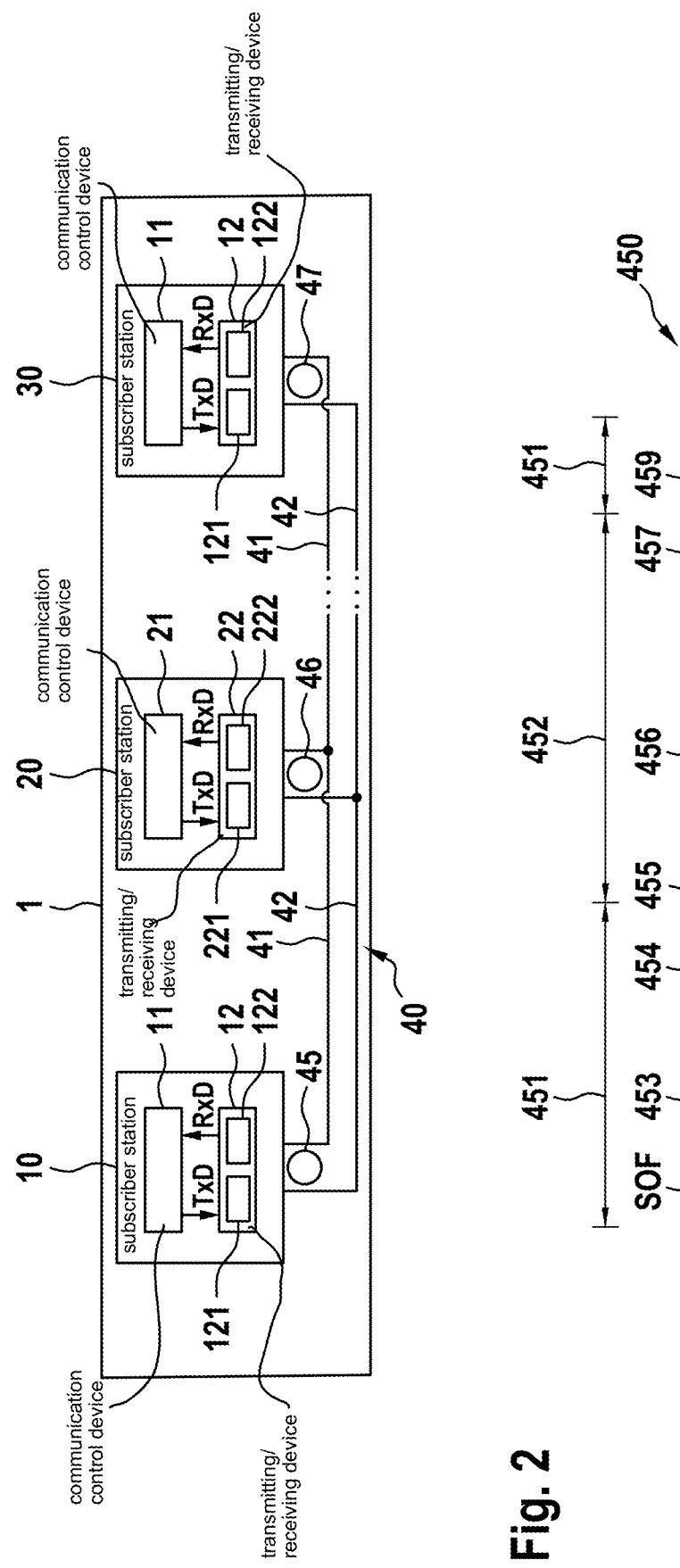
FIG. 1 shows a simplified block diagram of a bus system according to a first embodiment example of the present invention.
FIG. 2 shows a diagram for illustrating the structure of a message that can be transmitted from subscriber stations of the bus system according to the first embodiment example of the present invention.

FIG. 1 shows a bus system 1, which may, for example, be a CAN bus system, a CAN FD bus system, etc. at least in sections. The bus system 1 can be used in a vehicle, in particular a motor vehicle, an aircraft, etc., or in a hospital, etc.

In FIG. 1, the bus system 1 has a plurality of subscriber stations 10, 20, 30, each of which is connected to a bus 40 or bus line with a first bus wire 41 and a second bus wire 42. The bus wires 41, 42 may also be called CAN_H and CAN_L for the signals on the bus 40. Via the bus 40, messages 45, 46, 47 can be transferred in the form of signals between the individual subscriber stations 10, 20, 30. The subscriber stations 10, 20, 30 are, for example, control devices or display devices of a motor vehicle.

As shown in FIG. 1, the subscriber stations 10, 30 each have a communication control device 11 and a transmitting/receiving device 12. The transmitting/receiving device 12 has a transmission module 121 and a reception module 122.

The subscriber station 20 has a communication control device 21 and a transmitting/receiving device 22. The transmitting/receiving device 22 has a transmission module 221 and a reception module 222.

The transmitting/receiving devices 12 of the subscriber stations 10, 30 and the transmitting/receiving device 22 of the subscriber station 20 are each connected directly to the bus 40, although this is not shown in FIG. 1.

The communication control devices 11, 21 each serve to control a communication of the respective subscriber station 10, 20, 30 via the bus 40 with at least one other subscriber station of the subscriber stations 10, 20, 30 connected to the bus 40.

The communication control device 11 creates and reads first messages 45, 47, which are, for example, modified CAN messages 45, 47. In this case, the modified CAN messages 45, 47 are, for example, constructed on the basis of the CAN XL format. The transmitting/receiving device 12 is used to transmit and receive the messages 45, 47 from the bus 40. The transmission module 121 receives a digital transmit signal TxD created by the communication control device 11 for one of the messages 45, 47 and converts it into signals on the bus 40. The digital transmit signal TxD may be a pulse-width-modulated signal at least temporarily or in sections. The reception module 122 receives signals, transmitted on the bus 40, according to the messages 45 to 47 and generates therefrom a digital receive signal RxD. The reception module 122 transmits the receive signal RxD to the communication control device 11.

In addition, the communication control device 11 can be designed to create and read second messages 46, which are, for example, CAN SIC messages 46. The transmitting/receiving device 12 can be designed accordingly.

The communication control device 21 can be designed like a conventional CAN controller according to ISO 11898-1:2015, i.e., like a CAN FD-tolerant traditional CAN controller or a CAN FD controller or a CAN SIC controller. The communication control device 21 creates and reads second messages 46, for example CAN FD messages or CAN SIC messages. The transmitting/receiving device 22 is used to transmit and receive the messages 46 from the bus 40. The transmission module 221 receives a digital transmit signal TxD created by the communication control device 21 and converts it into signals for a message 46 on the bus 40. The reception module 222 receives signals, transmitted on the bus 40, according to the messages 45 to 47 and generates therefrom a digital receive signal RxD. The transmitting/receiving device 22 may be designed like a conventional CAN FD transceiver or CAN SIC transceiver.

For transmitting the messages 45, 46, 47 with CAN SIC or CAN XL, proven properties that are responsible for the robustness and user friendliness of CAN and CAN FD, in particular frame structure with identifier and arbitration according to the conventional CSMA/CR method, are adopted. The CSMA/CR method has the consequence that there must be so-called recessive states on the bus 40, which can be overwritten by other subscriber stations 10, 20, 30 with dominant levels or dominant states on the bus 40.

With the two subscriber stations 10, 30, formation and then transfer of messages 45, 47 with various CAN formats, in particular the CAN FD format or the CAN SIC format or the CAN XL format, as well as the reception of such messages 45, 47 can be realized. This is described in more detail below for a message 45.

FIG. 2 shows, for the message 45, a frame 450, which is in particular a CAN XL frame, as provided by the communication control device 11 for the transmitting/receiving device 12 for transmission to the bus 40. Here, the communication control device 11 in the present embodiment example creates the frame 450 to be compatible with CAN FD. Alternatively, the frame 450 is compatible with any successor standard for CAN FD.

According to FIG. 2, the frame 450 for the CAN communication on the bus 40 is divided into different communication phases 451, 452, namely, an arbitration phase 451 (first communication phase) and a data phase 452 (second communication phase). After a start bit SOF, the frame 450 has an arbitration field 453, a control field 454, a first switching field 455, a data field 456, a checksum field 457, a second switching field 458, and a frame termination field 459. The checksum panel 457, the second switching field 458, and the frame termination field 459 form a frame end phase 457, 458, 459 of the frame 450.

In the arbitration phase 451, an identifier (ID) in the arbitration field 453 is used to negotiate between the subscriber stations 10, 20, 30 bit by bit which subscriber station 10, 20, 30 wishes to transmit the message 45, 46 with the highest priority and therefore gains exclusive access to the bus 40 of the bus system 1 for the near future for transmitting in the subsequent data phase 452. In the arbitration phase 451, a physical layer is used, as in CAN and CAN FD. The physical layer corresponds to the bit transfer layer or layer 1 of the conventional OSI (open systems interconnection) model.

During the phases 451, the conventional CSMA/CR method is used, which allows simultaneous access of the subscriber stations 10, 20, 30 to the bus 40 without the higher priority message 45, 46 being destroyed. As a result, further bus subscriber stations 10, 20, 30 can be added relatively simply to the bus system 1, which is very advantageous.

The CSMA/CR method has the consequence that there must be so-called recessive states on the bus 40, which can be overwritten by other subscriber stations 10, 20, 30 with dominant levels or dominant states on the bus 40. In the recessive state, high ohmic conditions prevail at the individual subscriber station 10, 20, 30, which, in combination with the parasites of the bus wiring, results in longer time constants. This leads to a limitation of the maximum bit rate of the present-day CAN FD physical layer to, currently, about 2 megabits per second in real vehicle use.

At the end of the arbitration phase 451, switching into the data phase 452 takes place by means of the first switching field 455.

In the data phase 452, in addition to a part of the first switching field 455, the payload data of the CAN XL frame 450 or of the message 45 from the data field 456, as well as the checksum field 457 and a part of the second switching field 458 are transmitted. At the end of the data phase 452, switching back again into the arbitration phase 451 takes place by means of the second switching field 458.

A transmitter of the message 45 does not begin to transmit bits of the data phase 452 to the bus 40 until the subscriber station 10 as the transmitter has won the arbitration and the subscriber station 10 as transmitter thus has exclusive access to the bus 40 of the bus system 1 for transmission.

In the arbitration phase 451 as the first communication phase, the subscriber stations 10, 30 thus partially use, in particular up to the FDF bit (inclusive), a format, from CAN/CAN FD, according to ISO11898-1:2015. However, in the data phase 452 as the second communication phase, an increase in the net data transfer rate, in particular to more than 10 megabits per second, is possible in comparison to CAN or CAN FD. In addition, it is possible to increase the size of the payload data per frame, in particular to about 2 kbytes or any other value.

Figure 3:
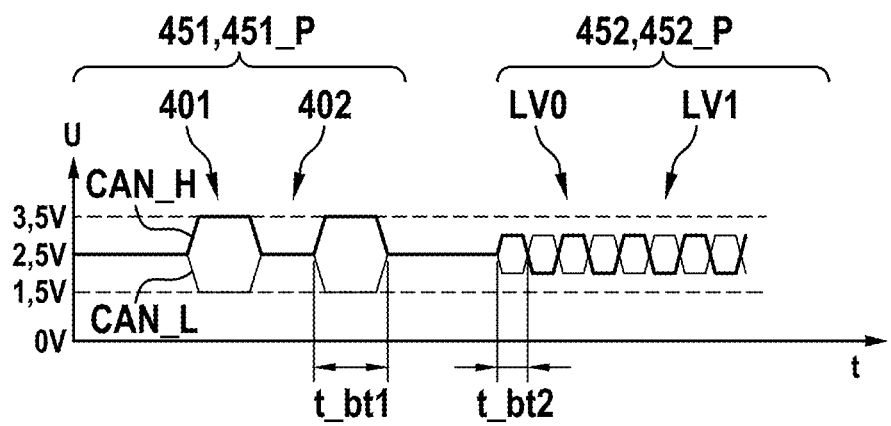
FIG. 3 shows an example of the ideal time curve of CAN_H, CAN_L bus signals, which are transmitted from subscriber stations of the bus system for the message of FIG. 2 to a bus of the bus system.

As shown in FIG. 3, in the arbitration phase 451, the transmitting/receiving devices 12 use a first physical layer 451_P to transmit a transmit signal TxD (FIG. 1) over the time t as signals CAN_H, CAN_L to the bus 40. The same applies to the transmitting/receiving device 22. In contrast, in the data phase 452, the transmitting/receiving device 12 can use a second physical layer 452_P, different from the first physical layer 451_P, to transmit the transmit signal TxD (FIG. 1) as signals CAN_H, CAN_L to the bus 40, as already described above. For the physical layer 452_P, there are two operating modes, namely, FAST_TX and FAST_RX, as described in more detail below.

On the left side, FIG. 3 shows that the subscriber stations 10, 20, 30 in the arbitration phase 451 each transmit signals CAN_H, CAN_L over the time t to the bus 40, which signals have a first bit duration t_bt1. The signals CAN_H, CAN_L are serial signals and alternately have at least one dominant state 401, in which VCAN_H=3.5 V and VCAN_L=1.5 V applies, or at least one recessive state 402, in which VCAN_H=VCAN_L=2.5 applies. In the case of an NRZ encoding of the transmit signal TXD in the phase 451, a dominant state 401 (dom) is driven if TXD=0, or LW (Low), applies. A recessive state 402 (rec) is generated or arises in the case of an NRZ encoding of the transmit signal TXD in the phase 451 if TXD=1, or HI (HIGH), applies. After the arbitration in the arbitration phase 451, one of the subscriber stations 10, 20, 30 is the decided winner.

If the respective subscriber station 10, 20, 30 recognizes the signaling in the first switching field 455 of FIG. 2 for the switching from the first to the second communication phase 451, 452, the associated transmitting/receiving device 12 switches its physical layer 451_P at the end of the arbitration phase 451 from a first operating mode (SLOW), which may alternatively be designed as a SIC operating mode, into the physical layer 452_P of the data phase 452. For this purpose, the operating modes of the data phase 452 are switched on as follows.

Assuming the first subscriber station 10 has won the arbitration. In this case, the transmitting/receiving device 12 of the subscriber station 10, in particular due to signaling in the first switching field 455 of FIG. 2, switches its physical layer 451_P at the end of the arbitration phase 451 from the first operating mode (SLOW) into the physical layer 452_P of the data phase 452 for a second operating mode (FAST_TX) of the transmitting/receiving device 12 since the subscriber station 10 is the transmitter of the message 45 in the data phase 452. As shown in FIG. 3, in the data phase 452 or in the second operating mode (FAST_TX), the transmission module 121 then generates, depending on a transmit signal TxD in succession and thus serially, the states LV0 or LV1 with the physical layer 452_P for the signals CAN_H, CAN_L on the bus 40. In the case of a pulse width modulation (PWM encoding) of the transmit signal TXD, the state LV0 (VCAN_H=3.0 V, VCAN_L=2.0 V) is driven for a first PWM symbol in the transmit signal TXD. The state LV1 (VCAN_H=2.0 V and VCAN_L=3.0 V) in the case of the pulse width modulation (PWM encoding) of the transmit signal TXD is driven for a second PWM symbol, different from the first PWM symbol, in the transmit signal TXD.

The frequency of the signals CAN_H, CAN_L can be increased in the data phase 452. In the example of FIG. 3, the bit time or bit duration t_bt2 in the data phase 452 is shorter or less than the bit time or bit duration t_bt1 in the arbitration phase 451 for this purpose. The net data transfer rate in the data phase 452 is thus increased in comparison to the arbitration phase 451 in the example of FIG. 3.

By contrast, the transmitting/receiving device 12 of the subscriber station 30, for example, switches its physical layer 451_P at the end of the arbitration phase 451 from the first operating mode (SLOW or SIC) into the physical layer 452_P of the data phase 452 for a third operating mode (FAST_RX) of the transmitting/receiving device 12 since the subscriber station 30 is only a receiver, and not a transmitter, of the frame 450 in the data phase 452.

If the transmitting/receiving device 12 recognizes, in particular with the signaling in the second switching field 458 of FIG. 2, that switching from the data phase 452 back into the arbitration phase 451 is to be carried out, the transmitting/receiving device 12 is switched from transmitting (FAST_TX operating mode) (and) or receiving (FAST_RX operating mode) signals with the physical layer 452_P to transmitting and/or sending signals with the physical layer 451_P. After the end of the data phase 452, all transmitting/receiving devices 12 thus switch their operating mode into the first operating mode (SLOW or SIC). All transmitting/receiving devices 12 can thus not only switch between the bit durations t_bt1, t_bt2 but also switch their physical layer, as described above.

The curve of the corresponding signals in the transmitting/receiving device 12 when switching from the phase 451 into the phase 452, during the data phase 452, and when switching from the phase 452 back into the phase 451 is explained in more detail below with reference to FIG. 10 to FIG. 15.

Figure 4:
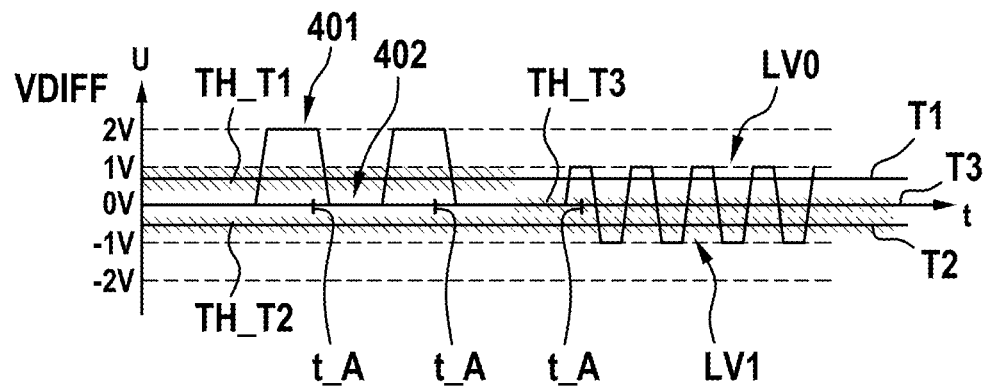
FIG. 4 shows the time curve of a differential voltage VDIFF, which is equal to the bus voltage VBUS, in particular equal to VCAN, and forms on the bus of the bus system as a consequence of the bus signals of FIG. 3.

According to FIG. 4, a differential signal VDIFF=CAN_H-CAN_L with values of VDIFF=2 V for dominant states 401 (dom) and VDIFF=0 V for recessive states 402 (rec) forms on the bus 40 in the ideal case in the arbitration phase 451 over the time t. The curve of VDIFF in the phase 451 is shown on the left side in FIG. 4. By contrast, a differential signal VDIFF=CAN_H-CAN_L corresponding to the states LV0, LV1 of FIG. 4 forms on the bus 40 in the data phase 452 over the time t, as shown on the right side in FIG. 4. The state LV0 has a value VDIFF=1 V. The state LV1 has a value VDIFF=−1 V.

The reception module 122 can in each case distinguish the states 401, 402 with two of the reception thresholds T1, T2, T3, which are in the ranges TH_T1, TH_T2, TH_T3. For this purpose, the reception module 122 samples the signals of FIG. 3 or FIG. 4 at times t A, as shown in FIG. 4. In order to evaluate the sampling result, in the arbitration phase 451, the reception module 122 uses the reception threshold T1 of, for example, 0.7 V and the reception threshold T2 of, for example, −0.35 V. By contrast, in the data phase 452, the reception module 122 uses only signals that were evaluated with the reception threshold T3. When switching between the first to third operating modes (SLOW or SIC, FAST_TX, FAST_RX) described above with reference to FIG. 3, the reception module 122 in each case switches the reception thresholds T2, T3.

The reception threshold T2 serves to recognize whether the bus 40 is free when the subscriber station 12 is newly connected for communication on the bus 40 and attempts to integrate into the communication on the bus 40.

When the corresponding signals are received from the bus 40, each transmitting/receiving device 12 generates the associated receive signal RxD, as shown in FIG. 1. The receive signal RxD ideally does not have a time offset to the transmit signal TxD.

Figure 5:
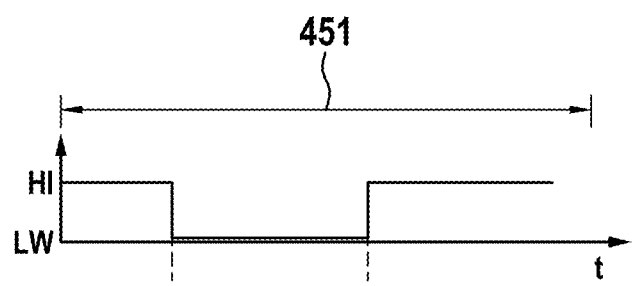
FIG. 5 shows an example of a time curve of a digital transmit signal, which is to be implemented in the arbitration phase (SIC operating mode) in CAN_H, CAN_L bus signals for a bus of the bus system of FIG. 1.

FIG. 5 shows an example of a part of the digital transmit signal TxD, which the transmission module 121 receives from the communication control device 11 in the arbitration phase 451 and generates therefrom the signals CAN_H, CAN_L for the bus 40. In FIG. 5, the transmit signal TxD switches from a state LW (Low) into a state HI (High) and back again into the state LW (Low).

Figure 6:
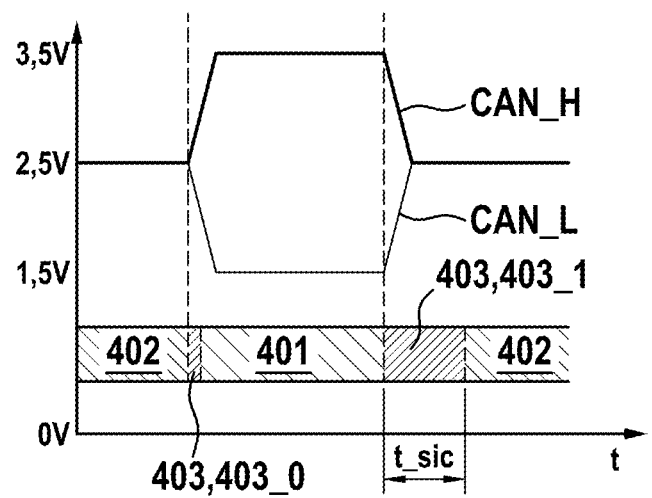
FIG. 6 shows the time curve of the CAN_H, CAN_L bus signals when changing between a recessive bus state into a dominant bus state and back into the recessive bus state, which signals are transmitted to the bus in the arbitration phase (SIC operating mode) due to the transmit signal of FIG. 5.

As shown in more detail in FIG. 6, for the transmit signal TxD of FIG. 5, the transmission module 121 generates the signals CAN_H, CAN_L for the bus wires 41, 42 such that a state 403 (sic) is additionally present. The state 403 (SIC) can be of different lengths, as shown with the state 403_0 (SIC) in the transition from the state 402 (rec) into the state 401 (dom) and with the state 403_1 (sic) in the transition from the state 401 (dom) into the state 402 (rec). The state 403_0 (sic) is shorter in time than the state 403_1 (sic). In order to generate signals according to FIG. 6, the transmission module 121 is switched into a SIC operating mode.

Passing through the short_sic state 403_0 is not required in CiA610-3, and the state is dependent on the type of implementation. The time duration of the "long" state 403_1 (sic) is specified as t_sic<530 ns for CAN SIC and for the SIC operating mode in CAN XL, starting with the rising edge of the transmit signal TxD of FIG. 5.

In the "long" state 403_1 (SIC), the transmission module 121 is to adjust the impedance between the bus wires 41 (CANH) and 42 (CANL) as well as possible to the characteristic wave impedance Zw of the bus line used. Zw=100 ohm or 120 ohm applies here. This adjustment prevents reflections and thus allows operation at higher bit rates. For simplicity, reference is always made below to the state 403 (sic) or sic state 403.

The transmission module 121 can be used to generate signals for the bus 40 for the following CAN types: CAN FD, CAN SIC and CAN XL.

TABLE 1

CAN types for transmission module 121

| CAN type | Communication phases/bit rate | Bus states | Transmission module states |
|---|---|---|---|
| CAN FD | Arbitration | dom, rec | dom, sic, rec |
| CAN SIC | Arbitration | dom, sic, rec | dom, sic, rec |
| CAN XL | Arbitration, or arbitration and data field in the case that switching to the Fast operating mode does not take place | dom, sic, rec | dom, sic, rec |
| CAN XL | Data phase | LV0, LV1 | LV0, LV1 |

It is thus possible to generate the transmission module state 403 (sic) not only in the case of CAN SIC or CAN XL (xl_sic). The transmission module state 403 (sic) can also be generated in the case of CAN FD. However, in the case of CAN FD, the time for the transmission module state 403 (sic) can be shorter than in the case of CAN SIC or CAN XL.

Figure 7:
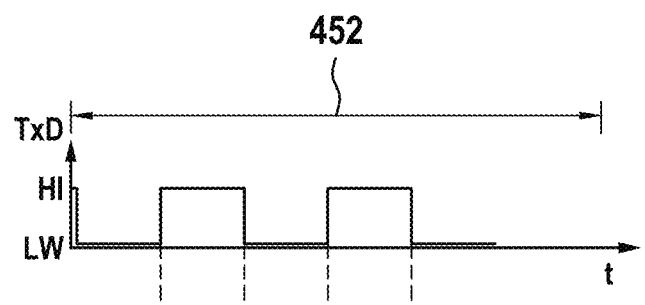
FIG. 7 shows an example of a time curve of a digital transmit signal, which is to be implemented in CAN_H, CAN_L bus signals for the bus of the bus system of FIG. 1 in the data phase.

FIG. 7 shows an example of another part of the digital transmit signal TxD, which the transmission module 121 receives from the communication control device 11 in the data phase 452 and generates therefrom the signals CAN_H, CAN_L for the bus 40. In FIG. 7, the transmit signal TxD switches several times from state HI (High) into a state LW (Low) and again into a state HI (High) and so on.

Figure 8:
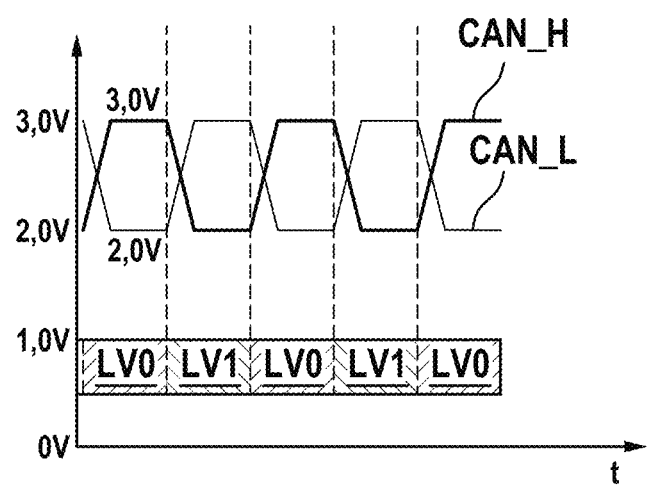
FIG. 8 shows the time curve of the CAN_H, CAN_L bus signals, which are transmitted to the bus in the data phase due to the transmit signal of FIG. 7.

As shown in more detail in FIG. 8, for the transmit signal TxD of FIG. 7, the transmission module 121 generates the signals CAN_H, CAN_L for the bus wires 41, 42 such that the state LV0 forms for a state LW (Low). In addition, the state LV1 forms for a state HI (High).

Figure 9:
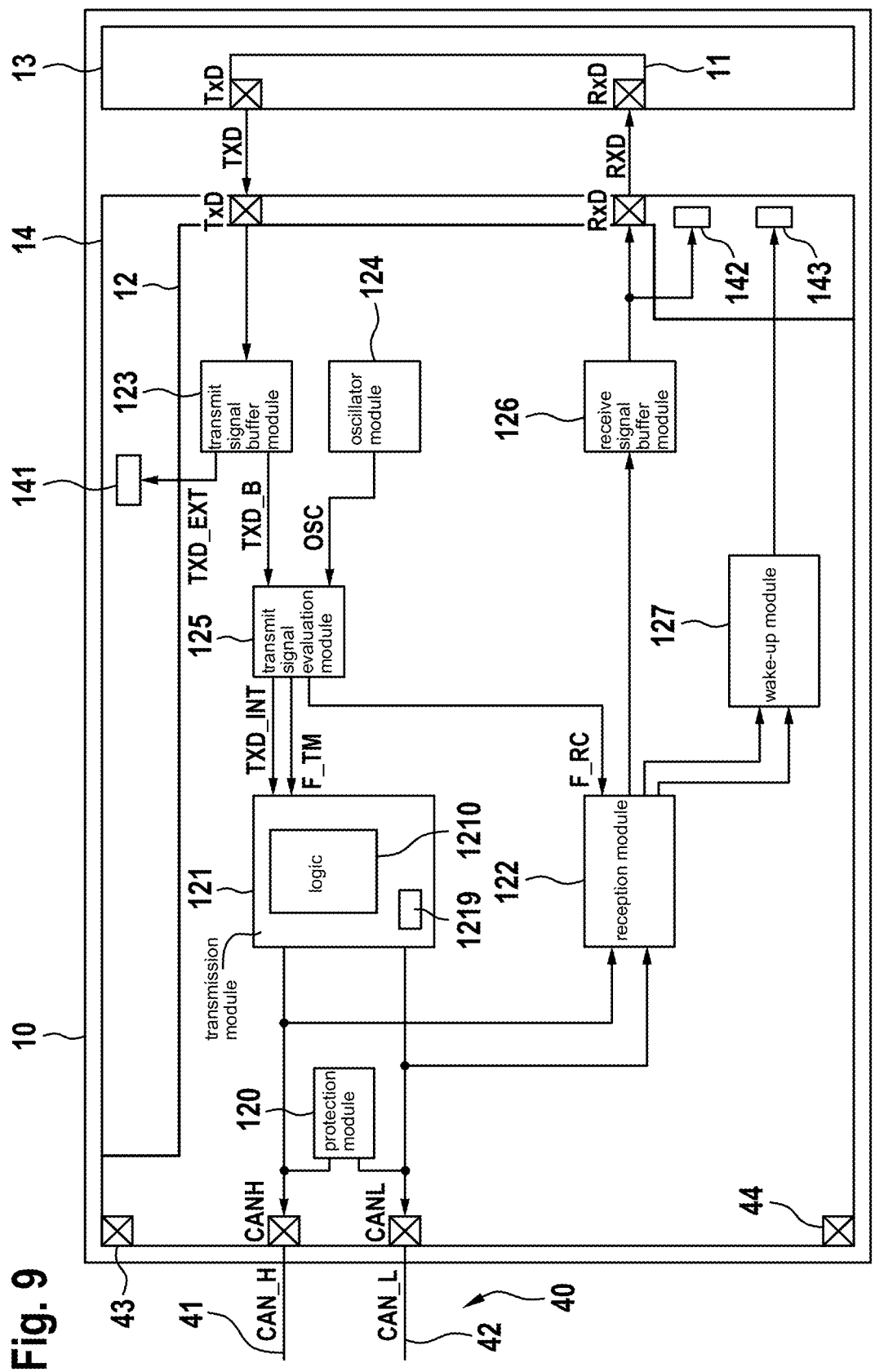
FIG. 9 shows a block diagram of a transmitting/receiving device for a subscriber station of the bus system according to the first embodiment example of the present invention.

FIG. 9 shows the basic construction of the subscriber station 10 with its communication control device 11 and its transmitting/receiving device 12. For explaining its function, FIG. 10 shows the transmit signal TXD, generated by the communication control device 11 and transmitted to the transmitting/receiving device 12, over the time t. The top of FIG. 10 also indicates the division of the signal TXD over the time t into the two communication phases 451, 452 and the switching fields 455, 458. In addition, in FIG. 10, individual bits of the two communication phases 451, 452 are also denoted by names. FIG. 11 and FIG. 12 show the signals TXD-INT and F_TM, generated by the transmitting/receiving device 12 from the signal TXD, over the time t. FIG. 13 shows the signals CAN_H, CAN_L transmitted to the bus 40 from the transmitting/receiving device 12 as a consequence thereof.

According to FIG. 9, the subscriber station 10 also has a microcontroller 13 and a system ASIC (ASIC=application-specific integrated circuit) 14. The system ASIC can be separate from the transmitting/receiving device 12 so that the transmitting/receiving device 12 is a separate device, which is also referred to as a stand-alone transceiver. The system ASIC 14 has digital parts 141, 142, 143, which can receive and evaluate signals from the transmitting/receiving device 12, in particular for diagnostic purposes, or can further process them.

The microcontroller 13 generates or processes data to be converted by the communication control device 11 into the corresponding frame format for transmitting messages 45, 47 via the bus 40.

The communication control device 11 can be designed as a protocol controller for transmitting and/or receiving CAN XL messages 45, 47. Optionally, the communication control device 11 is designed to transmit and/or receive CAN FD or CAN SIC messages 46. For transmitting the data to the bus 40, the communication control device 11 generates a transmit signal TXD according to the corresponding standard for CAN FD, CAN SIC or CAN XL messages 45, 47. At a port TxD, the device 11 outputs the transmit signal TXD to a port TxD of the transmitting/receiving device 12. The device 12 and the system ASIC 14 each have ports TxD and RxD.

The system ASIC 14 of the subscriber station 10 of FIG. 9 can alternatively be a system basis chip (SBC), which combines a plurality of functions necessary for an electronic assembly of the subscriber station 10. In addition to the transmitting/receiving device 12, an energy supply device (not shown), which supplies electrical power to the transmitting/receiving device 12 at a terminal 43, can be installed in the system ASIC 14. The energy supply device typically supplies a voltage CAN Supply of 5 V. However, the energy supply device can supply a different voltage with a different value as needed. Additionally, or alternatively, the energy supply device is designed as a current source. A terminal 44 is used to connect to ground, also called CAN-GND.

In the example of FIG. 9, in addition to the transmission module 121 and the reception module 122, the transmitting/receiving device 12 also has a protection module 120, a transmit signal buffer module 123, an oscillator module 124, a transmit signal evaluation module 125, a receive signal buffer module 126, and a wake-up module 127. FIG. 9 shows the modules 121 to 127 only in a simplified manner. The transmission module 120 has a logic 1210 and can optionally use parameters stored in a memory block 1219. The transmit signal evaluation module 125 is also hereinafter referred to as the evaluation module 125.

The protection module 120 is connected to the bus wires 41, 42 and serves to protect the transmitting/receiving device 12 from electrostatic discharge (ESD).

A transmit signal TXD received from the device 11 is temporarily stored in the transmit signal buffer module 123. In the case of CAN XL, the transmit signal TXD at the port TxD of the device 11 is a transmit signal that is pulse-width-modulated at least temporarily or in sections, as mentioned above with reference to FIG. 3 and shown as an example in FIG. 10. The transmit signal buffer module 123 outputs a transmit signal TXD EXT to the digital part 141 and a transmit signal TXD_B to the evaluation module 125. The evaluation module 125 also receives an oscillator signal OSC with a predetermined frequency f from the oscillator module 124.

The evaluation module 125 is designed to forward and/or process the transmit signal TXD_B using the oscillator signal OSC. In the first communication phase 451 of a message 45, in which the transmit signal TXD is not pulse-width-modulated (PWM), as shown in FIG. 10 for data states D1, D2, D3, a resXL bit as well as bits AH1, AL1, the evaluation module 125 forwards the transmit signal TXD_B unchanged to the transmission module 121. In the second communication phase 452 of the message 45, in which the transmit signal TXD is pulse-width-modulated (PWM), as likewise shown in FIG. 10 for bits B1, B2, B3, FCP1, FCP0, DAH, the evaluation module 125 carries out a pulse width demodulation of the transmit signal TXD_B.

The transmit signal TXD_INT output by the evaluation module 125 to the transmission module 121 is thus a decoded or pulse-width-demodulated transmit signal, as shown in FIG. 11.

According to FIG. 11, a distinction is made in the FAST operating mode between the two TXD symbols LL0 or Level0 (PWM duty cycle<50%) and LL1 or Level1 (PWM duty cycle>50%). The TXD_INT symbol Level0 is denoted by LL0 in FIG. 11 and corresponds to the state LV0 in FIG. 13 and the state L0 in FIG. 14. The TXD_INT symbol Level1 is denoted by LL1 in FIG. 11 and corresponds to the state LV1 in FIG. 13 and the state L1 in FIG. 14. As soon as the PWM encoding according to CiA610-3 transitions into an NRZ encoding, in which the specified time window does not contain two consecutive edges of the same direction, the evaluation module 125 again signals, with the signal F_TM, the switching into the SLOW or SIC operating mode to the transmission module 121. As a result, the transmission module 121 converts the signal TXD_INT again into the recessive or dominant bus voltage, or into the state sic, as described above with reference to FIG. 3 to FIG. 8. The signal F_TM is an operating mode switching signal with which switching into predetermined operating modes for the communication phases (451, 452) is to be signaled to the transmission module 121 in order to generate the analog differential signal CAN_H, CAN_L for the bus 40.

According to FIG. 9, the evaluation module 125 also outputs a signal F_TM to the transmission module 121 and a signal F_RC to the reception module 122. The signal F_TM is shown, for example, in FIG. 12. The signals F_TM, F_RC signal or indicate which physical layer the modules 121, 122 are to switch on, in particular whether the physical layer 452_P (FIG. 3) is to be switched on for the data phase 452 or not.

The transmission module 121 is designed to convert the transmit signal TXD_INT of the evaluation module 125 into the signals CAN_H, CAN_L according to FIG. 13 for the bus 40, as described above with reference to FIG. 3 to FIG. 8. The transmission module 121 is connected via ports CANH, CANL for the bus wires 41, 42 directly to the bus 40 in order to transmit analog signals CAN_H, CAN_L based on the transmit signal TXD_INT, to the bus 40.

As illustrated in FIG. 14 and FIG. 15, in conjunction with FIG. 11 to FIG. 13, the transmission module 121 is designed as follows for this purpose. The transmission module 121 generates, depending on the signaling with the transmit signal TXD or TXD_INT and the signal F_TM, a state 401 (dom) denoted in FIG. 14 by the letter D, or a state 402 (rec) denoted in FIG. 14 by the letter R, or a state 403 (sic) denoted in FIG. 14 by the letter S, or a state L0 or a state L1. For this purpose, the transmission module 121 selects, depending on the signaling of the transmit signal TXD or TXD_INT and the signal F_TM, the voltage value of the bus voltage VBUS as shown in FIG. 14, and/or the value of the impedance R_IN as shown in FIG. 15, in which ND stands for not defined and ∞ stands for infinite. The configuration and function of the transmission module 121 for this purpose is explained in further detail below with reference to FIG. 14 to FIG. 20 and also FIG. 21.

According to FIG. 9, the reception module 122 is also directly connected to the bus 40 via the ports CANH, CANL for the bus wires 41, 42. The reception module 122 is designed to generate the digital receive signal RXD from the signals CAN_H, CAN_L received from the bus 40 at the ports CANH, CANL. The reception module 122 transmits or forwards the receive signal RXD to the receive signal buffer module 126. In addition, the reception module 122 forwards the signals CAN_H, CAN_L to the wake-up module 127. The wake-up module 127 can also use the digital part 143 to determine whether the communication control device 11 should be woken up again after it has been put to sleep, for example in order to save energy.

The receive signal buffer module 126 outputs the receive signal RXD via the port RxD of the system ASIC 14 or of the transmitting/receiving device 12 to the port RxD of the microcontroller 13 or of the communication control device 11. In addition, the receive signal buffer module 126 forwards the receive signal RXD to the digital part 142.

Figure 16:
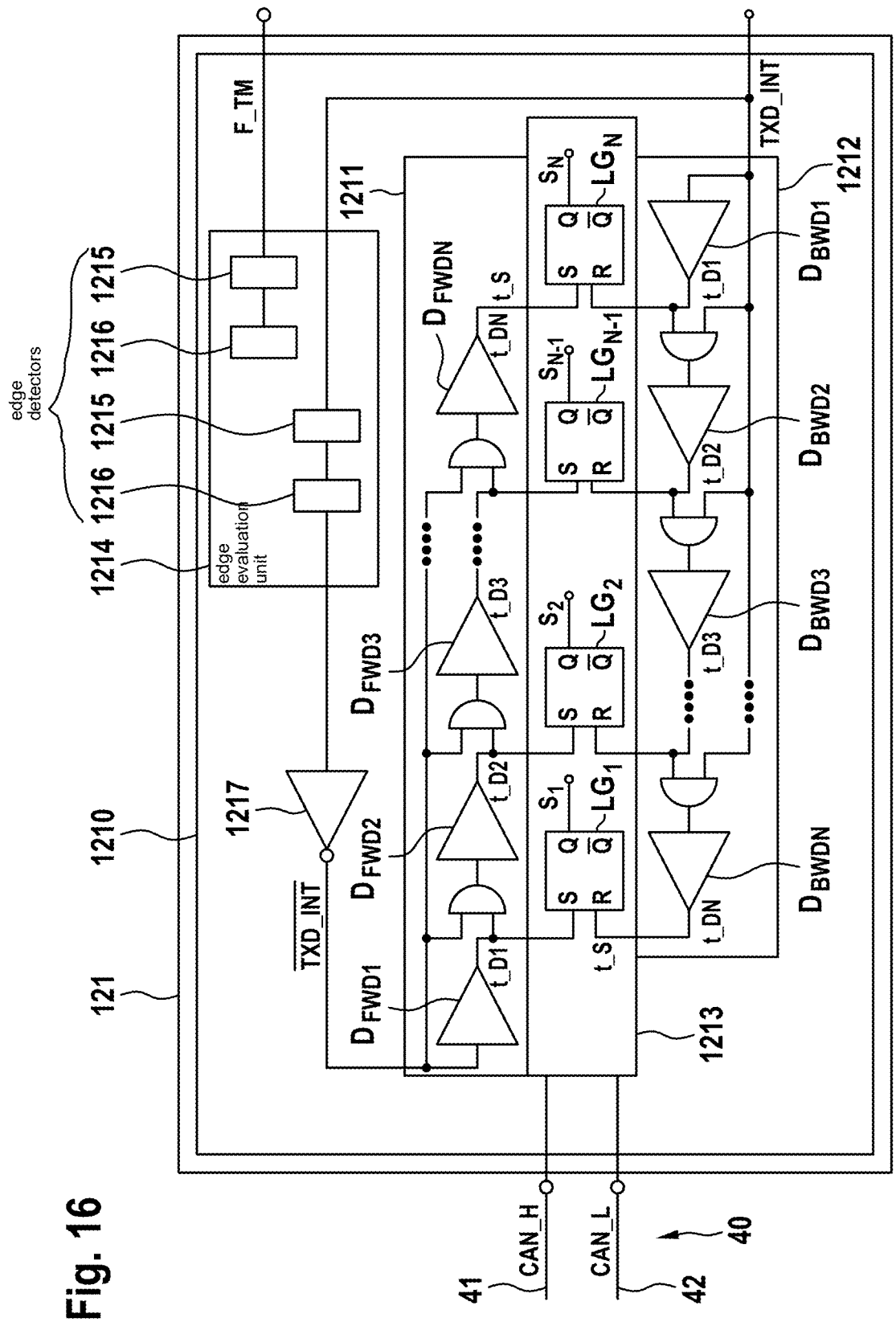
FIG. 16 shows a block diagram of a transmission module according to the first embodiment example for the transmitting/receiving device of FIG. 9.
Figure 17:
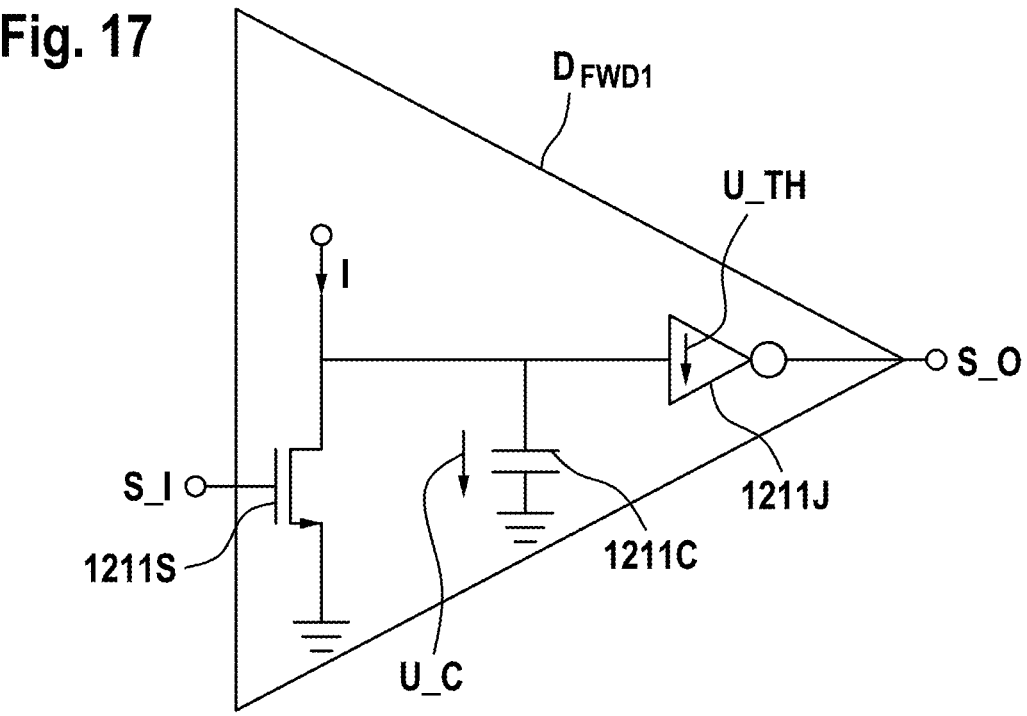
FIG. 17 shows an electrical circuit diagram of a delay element of the transmission module of FIG. 16, according to an example embodiment of the present invention.
Figure 18:
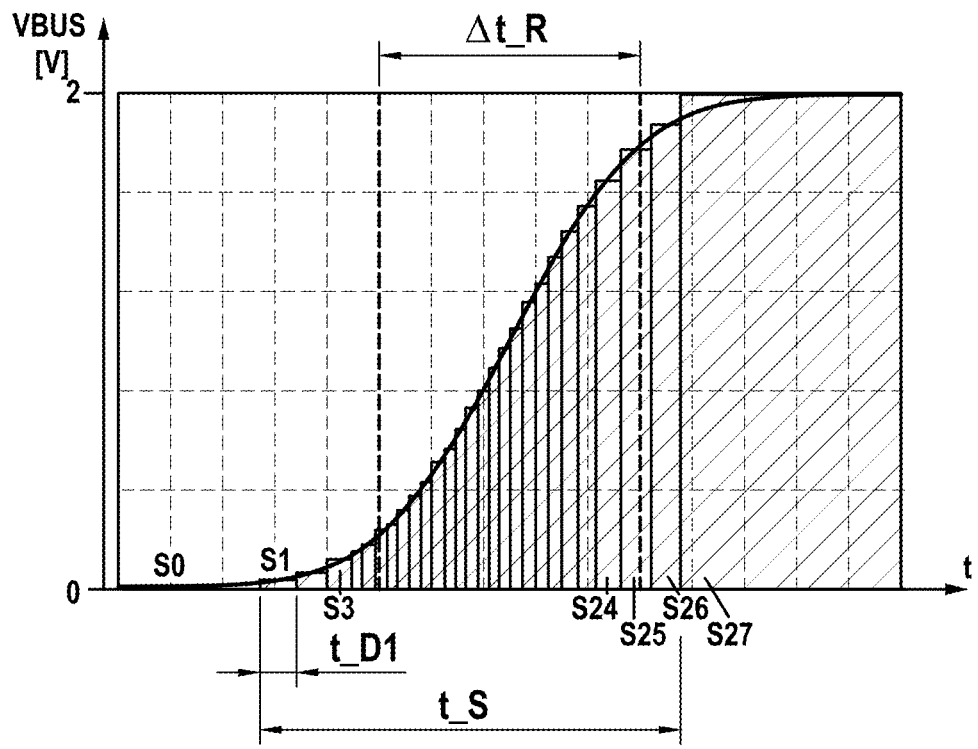
FIG. 18 shows a curve of the bus voltage over the time t, which curve is generated by the transmission module of FIG. 16 for a transition from a first state into a second state.

FIG. 16 shows the transmission module 121 of FIG. 9 in more detail. FIG. 17 shows the electric circuit of a delay element of the transmission module 121. According to FIG. 16, for the transmit signal TXD of FIG. 10, more precisely from the signal TXD_INT of FIG. 11 and the inverted signal $\overline{TXD\_INT}$ as well as with evaluation of the signal F_TM and with the signal amplitude levels or intermediate states S1, S2 to SN-1, SN, the transmission module 121 generates the signals CAN_H, CAN_L according to FIG. 13 on the bus 40. The signal amplitude levels or intermediate states S1, S2 to SN-1, SN are each intermediate levels between the states 401, 402, 403, LV0, LV1, which are to be generated on the bus 40 due to the signal TXD and the signal TXD_INT generated therefrom, and its inverted signal $\overline{TXD\_INT}$. FIG. 18 shows the signal amplitude levels or intermediate states S1, S2 to SN-1, SN for the example N=27 for a transition from the state 403 (sic) into the state (dom) over the time t. However, the number N does not have to be 27 but is a freely selectable natural number.

According to FIG. 16, the transmission module 121 has for this purpose a logic 1210 with a first switching chain 1211 in the forward direction; a second switching chain 1212 in the backward direction; a logic circuit 1213 with N logic elements $LG_1 \ldots LG_N$, which generate the signal levels or states S1, S2 . . . . SN-1, SN; an edge evaluation unit 1214 with edge detectors 1215, 1216; and an inverter 1217. The N logic elements $LG_1$ to $LG_N$ are, for example, flip-flops, in particular D-flip-flops, with inputs S, R and outputs Q, $\overline{Q}$, as shown in FIG. 16 as an example. N is a natural number>0. The output $\overline{Q}$ is the inverted output Q.

The inverter 1217 inverts the signal TXD_INT and thus generates the inverted signal $\overline{TXD\_INT}$.

The edge evaluation unit 1214 uses edge detectors 1215, 1216 to evaluate the signal F_TM and the transmit signal TXD_INT. The edge detectors 1215 detect whether a rising edge occurs in the relevant signal. The edge detectors 1216 detect whether a falling edge occurs in the relevant signal.

The first switching chain 1211 has in each case N delay elements $D_{FWD1}, D_{FWD2}, D_{FWD3}, \ldots D_{FWDN}$. Each of the N delay elements $D_{FWD1}, D_{FWD2}, \ldots D_{FWDN}$ is connected to one of the N logic elements $LG_1$ to $LG_N$ of the logic circuit 1213. Each of the N delay elements $D_{FWD1}, D_{FWD2}, D_{FWD3}, \ldots D_{FWDN}$ is constructed as shown in FIG. 17. An AND gate is connected downstream of each delay element $D_{FWD1}, D_{FWD2}, \ldots D_{FWDN-1}$ in FIG. 16. The N-th delay element $D_{FWDN}$ does not have a downstream AND gate. The respective delay element $D_{FWD1}, D_{FWD2}, D_{FWD3}, \ldots D_{FWDN}$ delays, in time, an edge of the signal that is input by the AND gate into the input of the associated delay element. The delay times t_D1 to t_DN of the edge can be stored as parameters in the memory block 1219. An input of each AND gate is connected to the port for the inverted signal TXD_INT.

The other input of each AND gate is connected to the output of the upstream delay element $D_{FWD1}, D_{FWD2}, D_{FWD3}, \ldots D_{FWDN-1}$ and to an input S of the assigned logic element $LG_1 \ldots LG_N$, as shown in FIG. 16.

The second switching chain 1212 has in each case N delay elements $D_{BWD1}, D_{BWD2}, \ldots D_{BWDN}$. Each of the N delay elements $D_{BWD1}, D_{BWD2}, D_{BWD3}, \ldots D_{BWDN}$ is connected to one of the N logic elements $LG_1 \ldots LG_N$ of the logic circuit 1213. Each of the N delay elements . . . . $D_{BWDN}$ is constructed as shown in FIG. 17. An $D_{BWD1}, D_{BWD2}, D_{BWD3}$, AND gate is connected downstream of each delay element $D_{BWD1}, D_{BWD2}, D_{BWD3}, \ldots D_{BWDN-1}$ in FIG. 16. The N-th delay element $D_{BWDN}$ does not have a downstream AND gate. The respective delay element $D_{BWD1}/D_{BWD2}, D_{BWD3}, \ldots D_{BWDN}$ delays, in time, an edge of the signal that is input by the AND gate into the input of the associated delay element. The delay time t D of the edge can be stored as a parameter in the memory block 1219. The same applies here as explained above for the first switching chain 1211. An input of each AND gate is connected to the port for the signal TXD_INT. The other input of each AND gate is connected to the output of the upstream delay element $D_{BWD1}, D_{BWD2}, D_{BWD3}, \ldots D_{BWDN-1}$ and to an input R of the assigned logic element $LG_1 \ldots LG_N$, as shown in FIG. 16.

The delay time t_D1, t_D2, t_D3 to t_DN of each individual delay element $D_{FWD1}, D_{FWD2}, \ldots D_{FWDN}$ corresponds to an individual time slice. The delay times t_D1, t_D2, t_D3 to t_DN of each individual delay element $D_{FWD1}, D_{FWD2}, \ldots D_{FWDN}$ are added up and result in a total sequence or total delay t_S, as shown in FIG. 18. The same applies to the N delay elements $D_{BWD1}, D_{BWD2}, D_{BWD3}, \ldots D_{BWDN}$.

In one configuration, the individual time slice, more precisely the delay time t_D1, t_D2, t_D3 to t_DN, is hardwired, so to speak, relative to the length of the total sequence/total delay t_S. This is realized according to FIG. 17 by a predetermined size of an electrical capacitance 1211C, which is selected for a time slice or the associated delay element and is chargeable with a switchable electrical reference current I. For this purpose, each of the N delay elements $D_{FWD1}, D_{FWD2}, D_{FWD3}, \ldots D_{FWDN}$ is constructed as shown for the delay element $D_{FWD1}$ in FIG. 17 as an example. In addition, each of the N delay elements $D_{BWD1}, D_{BWD2}, D_{BWD3}, \ldots D_{BWDN}$ is constructed accordingly.

According to FIG. 17, the electrical capacitance 1211C is connected in parallel to a switch 1211S and is charged to a voltage U_C by the electrical current I or discharged again. At the delay element $D_{FwD1}$ in FIG. 17, the electrical current I is fed into the connection that is present between switch 1211S and capacitance 1211C and that is connected to an input of an inverter 1211J. The switch 1211S is controlled by an input signal S_I, which is the inverted signal $\overline{TXD\_INT}$ at the element $D_{FWD1}$. The switch 1211S is, for example, a semiconductor switch, in particular an NMOS switch (NMOS=n-doped metal oxide semiconductor).

If the switch 1211S of the delay element $D_{FWD1}$ is an NMOS switch, the following applies. As soon as the input signal S_I changes to the value Low or 0 (=Low), the switch 1211S blocks and the capacitance 1211C is charged with the current I to a voltage U_C. As soon as the threshold voltage U_TH of the inverter 1211J is reached, i.e., U_C=U_TH applies, the signal S_O at the output of the inverter 1211J changes to the value Low or 0 (=Low). The output signal S_O is input into the following AND gate (FIG. 16) and controls the switch 1211S of the next delay element $D_{FWD2}$ while also evaluating the inverted signal $\overline{TXD\_INT}$. The switching chain 1211 is thus run through in sequence. If the input signal S_I at one of the N delay elements $D_{FWD1}$, $D_{FWD2}, \ldots D_{FWDN}$ changes to the value High or 1 (=High), the capacitance 1211C at this delay element is discharged again via the switch 1211S and the switching chain 1211 described above is run through in reverse.

The size of the electrical capacitance 1211C may be different for at least two time slices, i.e., for at least two delay elements of the switching chain 1211. The at least two delay elements of the switching chain 1212 are selected accordingly.

As shown in FIG. 18, each time slice, more precisely the respective delay time t_D1, t_D2, t_D3 to t_DN, has a specified percentage length in comparison to the length of the total sequence or total delay t_S. The sizes of the respective capacitances 1211C, in particular their order in the respective switching chain 1211, 1212, are selected accordingly. This also results in a predetermined rise time Δt_R of the edge between the two states on the bus 40.

As illustrated in FIG. 18, the order of the lengths of the respective delay times t_D1, t_D2, t_D3 to t_DN of the individual time slices along the length of the total sequence t_S specifies a fixed "transition shape" for the signal curve between two states of the states 401, 402, 403, LV0, LV1. In this case, the time length of the total sequence or total delay t_S is controlled by means of the reference current I. This is because the same electrical reference current I is applied to differently sized capacitances 1211C of the delay elements $D_{BWD1}, D_{BWD2}, \ldots D_{BWDN}$ and $D_{FWD1}, D_{FWD2}, \ldots D_{FWDN}$. This results in a differently fast rise in the voltage at the capacitance 1211C and thus a differently long time t, as shown in FIG. 18 for the delay times t_D1, t_D2, t_D3 to t_DN with N=27, until the inverter 1211J changes the state of an output signal S_O.

At least one setting for this reference current I is stored in memory block 1219.

The course of the transition between two states of the states 401, 402, 403, LV0, LV1 can be freely selectably set. Due to longer delay times t_D1, t_D2, t_D3 to t_DN at the beginning and end of the transition or of the sequence than in the middle, a spectrally optimal "smooth" overall transition from one state to the other can be approximated.

If more flexibility is required for the individual time slice, more precisely the delay times t_D1, t_D2, t_D3 to t_DN of the respective delay elements of at least one of the switching chains 1211, 1212, the length of each individual time slice can be stored in the memory block 1219 according to an alternative design. At least one of the switching chains 1211, 1212 has at least two parallel-connected capacitances 1211C for at least one of the time slices. As a result, the length of such an individual time slice can be achieved by connecting or disconnecting at least one parallel-connected capacitance 1211C. Alternatively, individual currents I can be stored for each time slice in order to vary the delay time t_D1, t_D2, t_D3 to t_DN of at least one delay element of at least one of the switching chains 1211, 1212. However, more switching effort is required for this increased flexibility than in the "hardwired" time slices described above.

The two independent switching chains 1211, 1212 in the forward and backward directions accomplish that the desired end state (dom, rec, sic, LV0, LV1) on the bus 40 is reached in a time-correct manner according to the specification of the transmit signal TXD and TXD_INT, respectively.

FIG. 16 shows a possible implementation for the bus voltage sequence between the states 403 (sic) and 401 (dom) or LV0 and LV1. Each signal amplitude level or intermediate state S1, S2 . . . . SN-1, SN of the logic elements $LG_1 \ldots LG_N$, in particular flip-flops, of the logic circuit 1213 unambiguously defines the state, namely, bus voltage and impedance, as shown in FIG. 14 and FIG. 15, of the corresponding intermediate state.

If a transition from the state 403 into 401 (sic→dom) is to take place, the static state with all logic elements $LG_1 \ldots LG_N$, in particular flip-flops, reset (S1 to SN=0) means that the transmission module 121 is in the sic state 403. A falling edge of TXD_INT, i.e., a rising edge of the inverted signal $\overline{TXD\_INT}$, starts the first switching chain 1211 in the forward direction, which sets the flip-flops of FIG. 16 sequentially to 1 with the defined delays until all flip-flops are set (S1 to SN=1). This state in the selected example corresponds to the dom state 401. A rising edge at the port for the signal TXD_INT releases the logic elements $LG_1 \ldots LG_N$, in particular flip-flops, and starts the sequential reset in the reverse direction through the defined times of the second switching chain 1212 in the backward direction. At a defined point in time, the second switching chain 1212 reaches the end state, which is the sic state 403 in the example described.

The described configuration of the transmission module 121 allows switching, invertible at any time, between all possible states of a state diagram of FIG. 17 with continuous behavior of the bus voltage VBUS and/or bus impedance R_IN at all times.

Accordingly, the first switching chain 1211 can change the amplitude of the bus voltage VBUS, in particular VCAN, and/or the value of the bus impedance R_IN in steps, depending on at least one edge of the transmit signal TXD_INT or of the inverted signal $\overline{TXD\_INT}$. In addition, the second switching chain 1212 can change the amplitude of the bus voltage VBUS, in particular VCAN, and/or the value of the bus impedance R_IN in steps, depending on at least one edge of the transmit signal TXD_INT or of the inverted signal $\overline{TXD\_INT}$.

Figure 19:
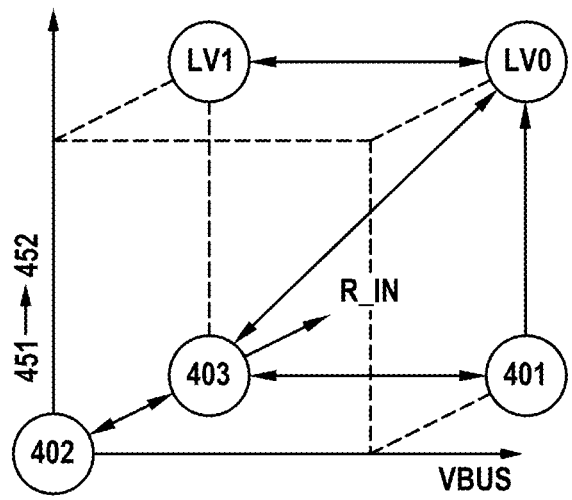
FIG. 19 and FIG. 20 show a circuit diagram in each case for illustrating the switching sequences of a transmission module according to the first embodiment example of the present invention.

In a three-dimensional representation in a state diagram, FIG. 19 shows the states that the transmission module 121 may approach with the allowed transitions (sequences) between the states. On the vertical axis in FIG. 19, the change from arbitration phase 451 to data phase 452 is plotted. On the horizontal axis in FIG. 19, the change of the bus voltage VBUS between the states 401 (dom), 402 (rec), 403 (sic) or the states LV0, LV1 is plotted. On the axis that goes into the drawing plane of FIG. 19 and that is vertical to the horizontal and vertical axis of FIG. 19, the bus impedance R_IN is plotted. The values of the following table 2 apply to the states generated by the transmission module 121. That is to say, the axes of FIG. 19 do not show the quantitative sizes of bus impedance R_IN and bus voltage VBUS since the states 403 (sic) and 401 (dom) do not have the same bus impedance R_IN or the states 403 (sic) and LV1 do not have the same bus voltage, as indicated in Table 2.

TABLE 2

Bus states for CAN FD, CAN SIC, CAN XL

| State | Bus voltage VBUS [V] | Bus impedance R_IN [Ω] | TXD_INT | F_TM |
|---|---|---|---|---|
| Rec (402) | 0 | 60000 | 1 | 0 |
| Dom (401) | 2 | 30 | 0 | 0 |
| LV0 | 1 | 100 | 0 | 1 |
| LV1 | −1 | 100 | 1 | 1 |
| Sic (403) | 0 | 100 | Transition state | Transition state |

According to FIG. 19, there are five states, namely, 401 (dom), 403 (sic), 402 (rec), LV1, LV0. Three is thus the minimum number of sequences, namely, impedance sequence, bus voltage sequence, FAST operating mode sequence, for transition between these five states. With two sequences, a maximum of 4 static states on the bus 40 can be represented.

At least one of the sequences of FIG. 19 is constructed as shown in FIGS. 16 and 17 and described above with reference to their switching chains 1211, 1212. The three dimensions of the "cube" of FIG. 19 visualize the states 401 (dom), 403 (sic), 402 (rec), LV1, LV0 of the three sequences.

In principle, there are many different ways to design these three sequences. Each sequence of the three sequences can be designed differently. Examples thereof are described above with reference to FIGS. 16 and 17.

Figure 20:
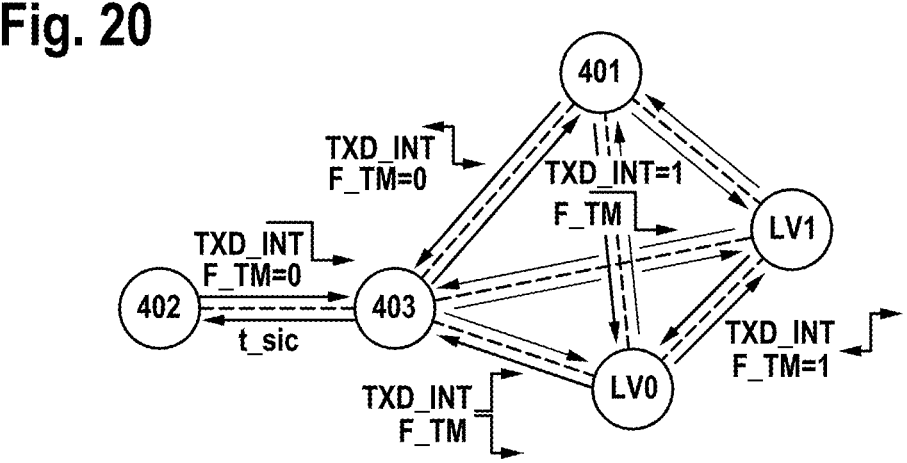

In order to reach the desired states on the bus 40 or end states of Table 2 and FIG. 19, the transmission module 121 proceeds along the aforementioned axes of FIG. 19 for an impedance sequence, bus voltage sequence, FAST operating mode sequence as follows. Here, the transmission module 121 uses different triggers, which are illustrated in FIG. 20.

For the implementation, an edge of each of the three triggers, namely, the signal TXD_INT, the signal F_TM, expiry of the time t-sic (FIG. 6), starts a sequence, clearly defined in time, of intermediate states of (defined) bus voltage VBUS and impedance R_IN. Depending on the edge of the trigger, the sequence is run through in one direction or the other. The sequences described below define three independent coordinate directions in space of the static CAN XL states and can therefore also be started and run through independently of one another. In FIG. 19, all CAN XL states 401, 402, 403, LV0, LV1 are shown as endpoints of the three independent sequences of all allowed states. The possible but not allowed paths are not shown in this figure for the sake of simplicity.

In the impedance sequence, the transmission module 121 switches the bus impedance R_IN from rec state 401 (60 kΩ) into the bus impedance of the sic state 403, namely, 100Ω, via defined intermediate impedances. The bus voltage VBUS of the end states and of all intermediate states remains unchanged, namely, VBUS=0 V. The trigger for running through the sequence in the rec→sic direction is a falling edge of TXD_INT while F_TM=0 simultaneously applies to the signal F_TM. The trigger for a run-through in the sic→rec direction is the expiry/end of the time t_sic while the transmission module 121 is in the normal operating mode SLOW and SIC, i.e., F_TM=0 applies.

In the bus voltage sequence, the transmission module 121 switches the bus voltage and bus impedance of the initial state into the bus voltage and bus impedance of the end state via defined intermediate states. In the normal operating mode SLOW or SIC, i.e., F_TM=0, the end with TXD_INT=1 defines the sic state with VBUS=0 V and R_IN=100Ω. By means of a falling edge of TXD_INT, the sic state is changed in a defined continuous manner into the dom state 402 with VBUS=2 V and R_IN approx. 30Ω. A rising edge of TXD_INT triggers the inverse transition from the state 401 (dom) into the state 403 (sic). If the transmission module 121 is in the FAST operating mode (F_TM=1), the initial state at TXT_INT=1 is the LV1 state with VBUS=1 V and R_IN=100Ω. Triggered by a falling edge at the port for the signal TXD_INT, the LV1 state is changed in a gradual and defined manner into the LV0 state with VBUS=−1 V. The impedance R_IN during the entire transition remains constant at R_IN=100Ω. A rising TXD_INT edge in the FAST operating mode causes the inverse sequence.

In the case of a static TXD_INT signal, the FAST operating mode sequence defines the transition between the traditional CAN states dom, sic, rec into the CAN XL-specific states LV0, LV1.

As shown in more detail in FIG. 20, for this purpose, a rising edge at the port for the signal F_TM and a falling edge at the port for the signal F_TM are to be considered in each case in combination with the value of the transmit signal TXD_INT. For example, the transmission module 121 is designed as follows.

In the case of a static or constant TXD_INT=1, a rising edge at the port for the signal F_TM triggers the sequence of the transition from the sic state 403 into the LV1 state. VBUS=0 V and R_IN=100Ω apply in the case of the sic state 403; VBUS=−1 V and R_IN=100Ω apply in the case of the LV1 state. A falling edge at the port for the signal F_TM in the case of a constant signal TXD_INT triggers the inverted transition, i.e., from the LV1 state into the sic state 403. These two transitions are not allowed according to the CAN XL specification but are easily possible by means of the above-described configuration of the transmission module 121 and take place in a continuous manner with the impedance R_IN held constant.

A rising edge at the port for the signal F_TM triggers the allowed transition dom→LV0 in the case of a static or constant TXD_INT=0. For this purpose, the transmission module 121 continuously changes the bus voltage VBUS and the bus impedance R_IN, starting from the dom state 401 with VBUS=2 V and R_IN approx. 30Ω, in a defined sequence into the LV0 state with VBUS=1 V and RIN=100Ω. A falling edge at the port for the signal F_TM in the case of TXD_INT=0 triggers the inverse transition, i.e., from the LV0 state into the dom state 401. This transition is also not allowed according to the CAN XL specification but is easily possible by means of the above-described configuration of the transmission module 121. The allowed transition LV0→SIC (403) is achieved by simultaneously triggering the FAST operating mode sequence and the bus voltage sequence, wherein the triggering takes place by means of a falling edge of F_TM with a simultaneously rising edge of TXD_INT. A transition of the bus voltage VBUS=+1 into VBUS=0 with constant bus impedance R_IN=100 occurs by simultaneously running through the bus voltage sequence and the FAST operating mode sequence.

As shown in the three-dimensional state diagram of FIG. 19 and the two-dimensional diagram of FIG. 20, in the first communication phase (arbitration phase) 451, the transmission module 121 can change between the above-described states 401 (dom) and 403 (sic) in both directions. In addition, in the first phase 451, the transmission module 121 can change between the above-described states 402 (rec) and 403 (sic) in both directions. Moreover, in the second communication phase (data phase) 452, the transmission module 121 can change between the above-described states 402 (rec) and 403 (sic) in both directions. In other words, in the described state changes, the changes or transitions between the states are invertible. Depending on the control by the mentioned signals, the respectively newly driven states 401, 402, 403, LV0, LV1 can be approached immediately, starting from the current state 401, 402, 403, LV0, LV1.

As a result of this linearization of the topology for the first communication phase (arbitration phase) 451, there is only one route from the state 402 (rec) via the state 403 (sic) to the state (dom). This route can be interrupted and inverted at any point. The fast transition from the state 402 (rec)→state 403 (sic) ensures that the transition time from state 402 (rec)

into state 403 (sic) and each intermediate state is only determined by the sic→dom sequence or transition, and the dom state 401 is therefore reached in a time-correct manner. The possibility of inversion at any time also ensures the continuity of the bus voltage VBUS, in particular VCAN, and of the bus impedance R_IN.

According to FIG. 17, the transitions that the transmission module 121 allows form a state tetrahedron, which consists only of invertible transitions, as also shown in FIG. 20.

Figure 21:
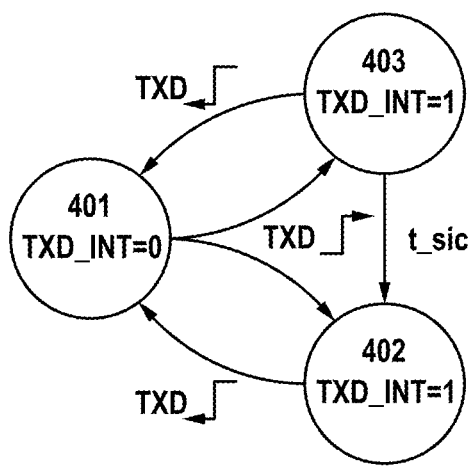
FIG. 21 shows a diagram for illustrating switching sequences of a conventional transmission module of the bus system according to a second embodiment example of the present invention.

In contrast, according to FIG. 21, in a conventional CAN FD and/or CAN XL transmission module 221, only a unidirectional transition is allowed between the states 403 (sic) and 402 (rec). In addition, only a unidirectional transition is allowed between the states 402 (rec) and 403 (dom). As a result, it is necessary to run through loops that are undesirable due to the thereby generated emissions and reflections, as described above. For example, while the signal F_TM remains static at F_TM=0, an edge of the transmit signal TXD leads to a transition, depending on the current state. Likewise, expiry of the time t_sic triggers the autonomous transition sic→rec or from state 403 into state 402. Due to the loop in the diagram of FIG. 21, an interrupted sic→rec transition or transition from state 403 into state 402 cannot be simply inverted without the disadvantages listed.

According to FIG. 19 and FIG. 20, in the first embodiment example with the transmitting/receiving device 12 of FIG. 9 and the transmission module 121 of FIG. 16, such a loop is avoided in that the sic state 403 is always positioned between 402 (rec) and 401 (dom), as shown in FIG. 19 and FIG. 20. A falling TXD edge in state 402 (rec) starts the transition from rec→sic, i.e., the transition from 402 into 403. Accordingly, the low-impedance switching of the state VBUS=0 V takes place in a very short time and always immediately subsequently leads to the sic→dom transition, i.e., the transition from 403 into 401, and thus into a defined controlled raising of the bus voltage to VBUS=2 V, with a continuous reduction of the impedance to R_IN=Low. "In a very short time" is in this case to be understood as a gradual reduction of the bus impedance over defined intermediate states at the gate speed of the logic circuit 1213 of FIG. 16, as shown in FIG. 18.

As a result, with the transmission module 121, discontinuities on the bus 40 are avoided and the dom state 401 is reached in a time-correct manner. With a rising edge of TXD, the reverse sequence is started and, via defined states, the sic state 403 is reached, which is gradually changed autonomously via defined states into the high ohmic state 402 (rec) after expiry of the time t-sic.

According to FIG. 19 and FIG. 20, the use of the linearized, thus simplified, topology of the transitions from 402 (rec) into 401 (dom) into 403 (sic) (rec/dom/sic transitions) thus results in a clear picture. This topology has great advantages in comparison to the plethora of all possible, allowed and not allowed, transitions in a conventional CAN FD transmission module 221 of the subscriber station 20 or a conventional CAN XL transmission module that is designed and proceeds according to FIG. 21.

As a result, the transmission module 121 conceptually excludes the occurrence of discontinuities in the bus voltage VBUS and in the bus impedance R_IN. Very advantageously, no unnecessary emissions and reflections are therefore generated.

Even if the switching of the transitions between any states of the states 401 (dom), 402 (rec), 403 (sic), LV0, LV1 on the bus 40 is incorrectly signaled, the transmission module 121 can realize robust, continuous and time-correct switching of the bus voltages VBUS or VCAN and of the bus impedances R_IN.

According to a modification of the first embodiment example, complete independence of the three coordinate axes is realized in FIG. 17. In this case, the transmission module 121 can reach any possible state inside the pyramid defined by the CAN XL states 401 (dom), 402 (rec), 403 (sic), LV0, LV1 as vertices.

According to a second embodiment example, the transmission module 121 does not only have a first step switch device with a first switching chain 1211 in the forward direction, a second switching chain 1212 in the backward direction, and a logic circuit 1213, as shown in FIG. 16.

Instead, the transmission module 121 additionally has a second step switch device, which likewise has a first switching chain 1211 in the forward direction, a second switching chain 1212 in the backward direction, and a logic circuit 1213, as shown in FIG. 16. The second step switch device can have a different number and/or size of the up to N time delay elements $D_{FWDN}$ and $D_{BWDN}$ than the first step switch device. In particular, the number N of the time delay elements $D_{FWDN}$ and $D_{BWDN}$ is different for the first step switch device than for the second step switch device. Additionally, or alternatively, in particular, at least one of the up to N time delay elements $D_{FWDN}$ and $D_{BWDN}$ has a different size than the other time delay elements $D_{FWDN}$ and $D_{BWDN}$ Of the first step switch device, as already described above with reference to FIG. 16 to FIG. 18.

A third step switch device can be designed like either the first or the second step switch device. Alternatively, the third step switch device is also designed differently, at least in number and/or size of the up to N time delay elements $D_{FWDN}$ and $D_{BWDN}$, than the first and/or second step switch device.

In this case, the transmission module 121 can carry out the impedance sequence with the first step switch device, for example. In addition, the transmission module 121 can carry out the bus voltage sequence with the second step switch device, for example. In addition, the transmission module 121 can carry out the FAST operating mode sequence with the third step switch device, for example.

The advantage of the above-described asynchronous delay chains 1211, 1212 for the transmission module 121 is primarily the fact that the states and all defined states need to be defined only once according to the desired signal form. The speed of the delay chain 1211, 1212 in this case defines the time in which this transition between the states takes place. If the delay chains 1211, 1212 are made tunable, for example, in particular through settable currents I at defined capacitance values, the transition time can be made settable with a consistent signal form, so that a slew rate control takes place. The speed of the transitions 401, 402, 403, LV0, LV1 is limited only by the maximum switching speed of the delay chains 1211, 1212 used.

Otherwise, the same applies to the second embodiment example as described above with reference to FIG. 14 to FIG. 20 and also FIG. 21.

According to a third embodiment example, the transmission module 120 does not have any delay chains 1211, 1212, but rather a logic 1210 designed as a synchronous logic 1210 for generating the switching sequences.

In a synchronous system, the clock frequency of the synchronous system is typically defined. A change in the slew rate is thus only possible through predetermined intermediate states. The predetermined intermediate states can be stored as parameters, for example in a memory, in particular a memory block of the transmitting/receiving device 12 and/or the memory block 1219 of the transmission module 121, as shown in FIG. 9.

A further significant disadvantage of synchronous systems is the fact that, with increasing data rates on the bus (currently a maximum of 20 MBps) and technology-related cutoff frequency for the reliable implementation of synchronous logic (e.g., maximum clock frequency 1 GHZ), the number of intermediate states is necessarily reduced. As a result, the desired curves of the bus voltage and of the bus impedance, which are necessary for emission and reflection reasons, become ever more coarse-grained and therefore spectrally worse with increasing data rate.

The transmission module 121 according to FIG. 16 with the delay chains 1211, 1212 does not exhibit this limitation and can easily achieve data rates well above 40 MBps.

All above-described configurations of the transmission module 121, the transmitting/receiving device 12, the subscriber stations 10, 20, 30, the bus system 1, and the method carried out therein, according to the embodiment examples and their modifications can be used individually or in all possible combinations. In addition, the following modifications are in particular possible.

The above-described bus system 1 according to one of the embodiment examples is described with reference to a bus system based on the CAN protocol. However, the bus system 1 according to at least one of the embodiment examples can alternatively be another type of communication network in which the signals are transferred as differential signals. It is advantageous, but not necessarily a prerequisite, that exclusive, collision-free access of a subscriber station 10, 20, 30 to the bus 40 is ensured in the bus system 1 at least for certain periods of time.

The bus system 1 according to at least one of the embodiment examples and their modifications is in particular a bus system in which communication between at least two of the subscriber stations 10, 20, 30 can take place according to two different CAN standards, for example CAN HS or CAN FD or CAN SIC or CAN XL. However, the bus system 1 can be a different communication network in which the signals are transferred as differential signals and serially via the bus 40. The functionality of the above-described embodiment examples can thus be used, for example, with transmitting/receiving devices 12, 22 that are to be operated in such a bus system.

The number and arrangement of the subscriber stations 10, 20, 30 in the bus system 1 according to at least one of the embodiment examples and their modifications is freely selectable.

The number of the step switch devices is freely selectable.

What is claimed is:

1. A transmission module for a transmitting/receiving device of a subscriber station of a serial bus system, the transmission module being configured to transmit a digital transmit signal as an analog differential signal on a bus of the bus system in order to transmit a message to at least one other subscriber station of the bus system, wherein bits of the digital transmit signal have a greater bit duration in a first communication phase than in a second communication phase of the transmit signal,
    wherein the transmission module is configured to generate states, specified by the digital transmit signal over time, on the bus by changing bus voltage and/or bus impedance,
    wherein the transmission module is configured to change the specified states on the bus via a predetermined sequence of intermediate states for the bus voltage and/or for the bus impedance toward a desired state on the bus, and
    wherein the transmission module is configured to, when signaling changes during a transition between two of the specified states on the bus, change the transition back again continuously with an opposite sequence of intermediate states from the intermediate state reached by then.

2. The transmission module according to claim 1, wherein the transmission module comprises a synchronous logic configured to generating the predetermined sequence of intermediate states for the bus voltage and/or for the bus impedance toward the desired state on the bus.

3. The transmission module according to claim 1, wherein:
    the transmission module is configured to generate the states of the digital transmit signal on the bus as dominant states and recessive states, and
    the transmission module is configured to generate a transition from a dominant state into a recessive state via an impedance-adjusted recessive state that corresponds to the recessive state with respect to the bus voltage but is generated with a different bus impedance than the recessive state and is transmitted at a beginning of each recessive state.

4. The transmission module according to claim 1, wherein the transmission module comprises:
    a first switching chain configured for changing an amplitude of the bus voltage and/or a value of the bus impedance in steps, depending on at least one edge of a transmit signal;
    a second switching chain configured for changing the amplitude of the bus voltage and/or the value of the bus impedance in steps, depending on at least one edge of an inverted transmit signal; and
    a logic circuit connected to the first switching chain and the second switching chain.

5. The transmission module according to claim 4, wherein each of the first and second switching chains includes delay elements, wherein each of the delay elements of the first switching chain delays the edge of the inverted transmit signal by a predetermined time, and wherein each of the delay elements of the second switching chain delays the edge of the transmit signal by the predetermined time.

6. The transmission module according to claim 4, wherein:
    the first switching chain alternately includes a delay element which has a switchable capacitance, and an AND gate, which are connected in series,
    second switching chain alternately includes a delay element which has a switchable capacitance, and an AND gate, which are connected in series, and
    wherein both the first switching chain and the second switching chain have a delay element at their beginning and at their end.

7. The transmission module according to claim 4, wherein at least two of the delay elements of each of the first and second switching chains have switchable capacitances of different sizes.

8. The transmission module according to claim 6, wherein, in the first and second switching chains, an output of each AND gate is connected to an input of one of the delay elements.

9. The transmission module according to claim 8, wherein the logic circuit includes a predetermined number of logic elements.

10. The transmission module according to claim 9, wherein:
one of the logic elements at its one input is connected to an output of the delay element arranged at the beginning of the first switching chain, and
one of the logic elements at its one input is connected to the output of the delay element arranged at the beginning of the second switching chain.

11. The transmission module according to claim 9, wherein the logic elements are flip-flops whose first input is connected to a first input of an AND gate of the first switching chain and whose second input is connected to a first input of an AND gate of the second switching chain.

12. The transmission module according to claim 11, wherein:
a second input of the AND gate of the second switching chain is connected to a port for inputting the digital transmit signal, and
a second input of the AND gate of the first switching chain is connected to a port for inputting the inverted digital transmit signal.

13. The transmission module according to claim 4, further comprising:
a first edge detector configured to detecting falling edges of the transmit signal;
a second edge detector configured to detect falling edges of an operating mode switching signal which signals to the transmission module an operating mode into which the transmission module is to be switched for a current communication phase;
a third edge detector configured to detect rising edges of the transmit signal;
a fourth edge detector configured to detect rising edges of the operating mode switching signal;
wherein the logic circuit is configured to generate the predetermined sequence of intermediate states for the bus voltage and/or for the bus impedance toward the desired state on the bus and is configured to operate based on a detection result of at least one of the first, second, third, and fourth edge detectors.

14. A transmitting/receiving device, comprising:
a transmission module configured to transmit a digital transmit signal as an analog differential signal on a bus of a serial bus system in order to transmit a message to at least one other subscriber station of the bus system, wherein bits of the digital transmit signal have a greater bit duration in a first communication phase than in a second communication phase of the transmit signal,
wherein the transmission module is configured to generate states, specified by the digital transmit signal over time, on the bus by changing bus voltage and/or bus impedance,
wherein the transmission module is configured to change the specified states on the bus via a predetermined sequence of intermediate states for the bus voltage and/or for the bus impedance toward a desired state on the bus, and
wherein the transmission module is configured to, when signaling changes during a transition between two of the specified states on the bus, change the transition back again continuously with an opposite sequence of intermediate states from the intermediate state reached by then; and
a reception module configured to receive signals from the bus and to generate a digital receive signal from the analog differential signal.

15. The transmitting/receiving device according to claim 14, wherein the transmission module is configured to generate the analog differential signals with a different physical layer in the first communication phase of the message than in the second communication phase.

16. A subscriber station for a serial bus system, comprising:
a transmitting/receiving device including:
a transmission module configured to transmit a digital transmit signal as an analog differential signal on a bus of a serial bus system in order to transmit a message to at least one other subscriber station of the bus system, wherein bits of the digital transmit signal have a greater bit duration in a first communication phase than in a second communication phase of the transmit signal,
wherein the transmission module is configured to generate states, specified by the digital transmit signal over time, on the bus by changing bus voltage and/or bus impedance,
wherein the transmission module is configured to change the specified states on the bus via a predetermined sequence of intermediate states for the bus voltage and/or for the bus impedance toward a desired state on the bus, and
wherein the transmission module is configured to, when signaling changes during a transition between two of the specified states on the bus, change the transition back again continuously with an opposite sequence of intermediate states from the intermediate state reached by then, and
a reception module configured to receive signals from the bus and to generate a digital receive signal from the analog differential signal; and
a communication control device configured to control communication in the bus system and to generating the digital transmit signal;
wherein the subscriber station is configured for the communication in a bus system in which exclusive, collision-free access of a subscriber station to the bus of the bus system is ensured at least temporarily.

17. A method for transmitting a message with differential signals in a serial bus system, wherein the method is performed with a transmission module of a transmitting/receiving device, the transmission module being configured to transmit a digital transmit signal as an analog differential signal on a bus of the bus system to transmit a message to at least one other subscriber station of the bus system, wherein bits of the digital transmit signal have a greater bit duration in a first communication phase than in a second communication phase of the transmit signal, and wherein the method comprises the following steps:
generating states specified by the digital transmit signal over time on the bus by changing bus voltage and/or bus impedance,
changing, by the transmission module, the specified states on the bus via a predetermined sequence of intermediate states or the bus voltage and/or for the bus impedance toward the desired state on the bus, and
changing, by transmission module, when signaling changes during a transition between two specified states on the bus, a transition back again continuously with an opposite sequence of intermediate states from the intermediate state reached by then.

* * * * *